US011727272B2

(12) United States Patent
Miller et al.

(10) Patent No.: US 11,727,272 B2
(45) Date of Patent: Aug. 15, 2023

(54) LIDAR-BASED DETECTION OF TRAFFIC SIGNS FOR NAVIGATION OF AUTONOMOUS VEHICLES

(71) Applicant: NVIDIA CORPORATION, Santa Clara, CA (US)

(72) Inventors: Derek Thomas Miller, Palo Alto, CA (US); Yu Zhang, Sunnyvale, CA (US); Lin Yang, San Carlos, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 367 days.

(21) Appl. No.: 16/905,334

(22) Filed: Jun. 18, 2020

(65) Prior Publication Data
US 2020/0401823 A1 Dec. 24, 2020

Related U.S. Application Data

(60) Provisional application No. 62/863,843, filed on Jun. 19, 2019.

(51) Int. Cl.
*G06N 3/00* (2023.01)
*G06N 3/08* (2023.01)
(Continued)

(52) U.S. Cl.
CPC .............. *G06N 3/08* (2013.01); *B60W 60/001* (2020.02); *G06F 18/23* (2023.01); *G06V 10/82* (2022.01);
(Continued)

(58) Field of Classification Search
CPC ...... G06V 20/582; G06V 10/82; G06V 20/64; B60W 60/001; B60W 2420/52;
(Continued)

(56) References Cited

U.S. PATENT DOCUMENTS 11,468,285 B1 * 10/2022 Tang ..................... G01S 17/89
2017/0019331 A1 1/2017 Yong
(Continued)

FOREIGN PATENT DOCUMENTS

WO 2018/104563 A2 6/2018

OTHER PUBLICATIONS

Arcos-Garcia et al, Exploiting synergies of 1 nobile mapping sensors and deep learning for traffic sign recognition systems, Expert Systems With Applications 89, pp. 286-295 (Year: 2017).*

(Continued)

*Primary Examiner* — Nancy Bitar
*Assistant Examiner* — Xiao Liu
(74) *Attorney, Agent, or Firm* — Maschoff Brennan

(57) ABSTRACT

According to an aspect of an embodiment, operations may comprise receiving a point cloud representing a region. The operations may also comprise identifying a cluster of points in the point cloud having a higher intensity than points outside the cluster of points. The operations may also comprise determining a bounding box around the cluster of points. The operations may also comprise identifying a traffic sign within the bounding box. The operations may also comprise projecting the bounding box to coordinates of an image of the region captured by a camera. The operations may also comprise employing a deep learning model to classify a traffic sign type of the traffic sign in a portion of the image within the projected bounding box. The operations may also comprise storing information regarding the traffic sign and the traffic sign type in a high definition (HD) map of the region.

14 Claims, 15 Drawing Sheets

(51) Int. Cl.
  *B60W 60/00*  (2020.01)
  *G06V 20/58*  (2022.01)
  *G06F 18/23*  (2023.01)
  *G06V 10/82*  (2022.01)
  *G06V 20/64*  (2022.01)

(52) U.S. Cl.
  CPC ............ *G06V 20/582* (2022.01); *G06V 20/64* (2022.01); *B60W 2420/52* (2013.01)

(58) Field of Classification Search
  CPC .......... B60W 2420/42; B60W 2556/40; G06K 9/6218; G06N 3/08
  See application file for complete search history.

(56) References Cited

U.S. PATENT DOCUMENTS

| | | |
|---|---|---|
| 2018/0104563 A1 | 4/2018 | Kounellas |
| 2018/0018806 A1 | 7/2018 | Wheeler et al. |
| 2019/0258251 A1* | 8/2019 | Ditty ..................... G06V 20/58 |
| 2020/0109954 A1* | 4/2020 | Li ..................... G01C 21/3841 |
| 2020/0285866 A1* | 9/2020 | Lee ..................... G06V 10/764 |
| 2020/0293796 A1* | 9/2020 | Sajjadi Mohammadabadi ............ G06N 3/084 |

OTHER PUBLICATIONS

Chen et al, Next Generation Map Making: Geo Referenced Ground Level LIDAR Point Clouds for Automatic Retro Reflective Road Feature Extraction, ACM GIS'09, pp. 488-491 (Year: 2009).*

Soilan et al, Traffic sign detection in MLS acquired point clouds for geometric and image-based semantic inventory, ISPRS Journal of Photogrammetry and Remote Sensing 114 (2016), pp. 92-101 (Year: 2016).*

Soilan et al., "Traffic sign detection in MLS acquired point clouds for geometric and image-based semantic inventory," ISPRS Journal of Photogrammetry and Remote Sensing, vol. 114, pp. 92-101 (Apr. 2016).

Written Opinion of the International Searching Authority dated Sep. 8, 2020 as received in Application No. PCT/US2020/038831.

* cited by examiner

Axes At 0, 90 Degrees

Length x Width = 2a

Axes At 45, 135 Degrees

Length x Width = 2a*√2

Difference Between The Two = √2

LIDAR-BASED DETECTION OF TRAFFIC SIGNS FOR NAVIGATION OF AUTONOMOUS VEHICLES

CROSS-REFERENCE TO A RELATED APPLICATION

This patent application claims the benefit of and priority to U.S. Provisional App. No. 62/863,843 filed Jun. 19, 2019, which is incorporated by reference in the present disclosure in its entirety for all that it discloses.

FIELD

The embodiments discussed herein are related to maps for autonomous vehicles, and more particularly to detecting traffic signs based on sensor data of autonomous vehicles, for example, LIDAR scans.

BACKGROUND

Autonomous vehicles, also known as self-driving cars, driverless cars, or robotic cars, may drive from a source location to a destination location without requiring a human driver to control or navigate the vehicle. Automation of driving may be difficult for several reasons. For example, autonomous vehicles may use sensors to make driving decisions on the fly, or with little response time, but vehicle sensors may not be able to observe or detect some or all inputs that may be required or useful to safely control or navigate the vehicle safely in some instances. Vehicle sensors may be obscured by corners, rolling hills, other vehicles, etc. Vehicles sensors may not observe certain inputs early enough to make decisions that may be necessary to operate the vehicle safely or to reach a desired destination. In addition, some inputs, such as lanes, road signs, or traffic signals, may be missing on the road, may be obscured from view, or may not be readily visible, and therefore may not be detectable by sensors. Furthermore, vehicle sensors may have difficulty detecting emergency vehicles, a stopped obstacle in a given lane of traffic, or road signs for rights of way.

Autonomous vehicles may use map data to discover some of the above information rather than relying on sensor data. However, conventional maps have several drawbacks that may make them difficult to use for an autonomous vehicle. For example, conventional maps may not provide the level of precision or accuracy that for navigation within a certain safety threshold (e.g., accuracy within 30 centimeters (cm) or better). Further, GPS systems may provide accuracies of approximately 3-5 meters (m) but have large error conditions that may result in accuracies of over 100 m. This lack of accuracy may make it challenging to accurately determine the location of the vehicle on a map or to identify (e.g., using a map, even a highly precise and accurate one) a vehicle's surroundings at the level of precision and accuracy desired.

Furthermore, conventional maps may be created by survey teams that may use drivers with specially outfitted survey cars with high resolution sensors that may drive around a geographic region and take measurements. The measurements may be provided to a team of map editors that may assemble one or more maps from the measurements. This process may be expensive and time consuming (e.g., taking weeks to months to create a comprehensive map). As a result, maps assembled using such techniques may not have fresh data. For example, roads may be updated or modified on a much more frequent basis (e.g., rate of roughly 5-10% per year) than a survey team may survey a given area. For example, survey cars may be expensive and limited in number, making it difficult to capture many of these updates or modifications. For example, a survey fleet may include a thousand survey cars. Due to the large number of roads and the drivable distance in any given state in the United States, a survey fleet of a thousand cars may not cover the same area at the same frequency of road changes to keep the map up to date on a regular basis and to facilitate safe self-driving of autonomous vehicles. As a result, conventional techniques of maintaining maps may be unable to provide data that is sufficiently accurate and up to date for the safe navigation of autonomous vehicles.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may comprise receiving a point cloud representing a region, the point cloud captured by a LIDAR sensor mounted on a vehicle. The operations may also comprise identifying a cluster of points in the point cloud having a higher intensity than points outside the cluster of points. The operations may also comprise determining a bounding box around the cluster of points. The operations may also comprise identifying a traffic sign within the bounding box. The operations may also comprise projecting the bounding box to coordinates of an image of the region captured by a camera. The operations may also comprise employing a deep learning model to classify a traffic sign type of the traffic sign in a portion of the image within the projected bounding box. The operations may also comprise storing information regarding the traffic sign and the traffic sign type in a high definition (HD) map of the region.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Overview

Figure 1:
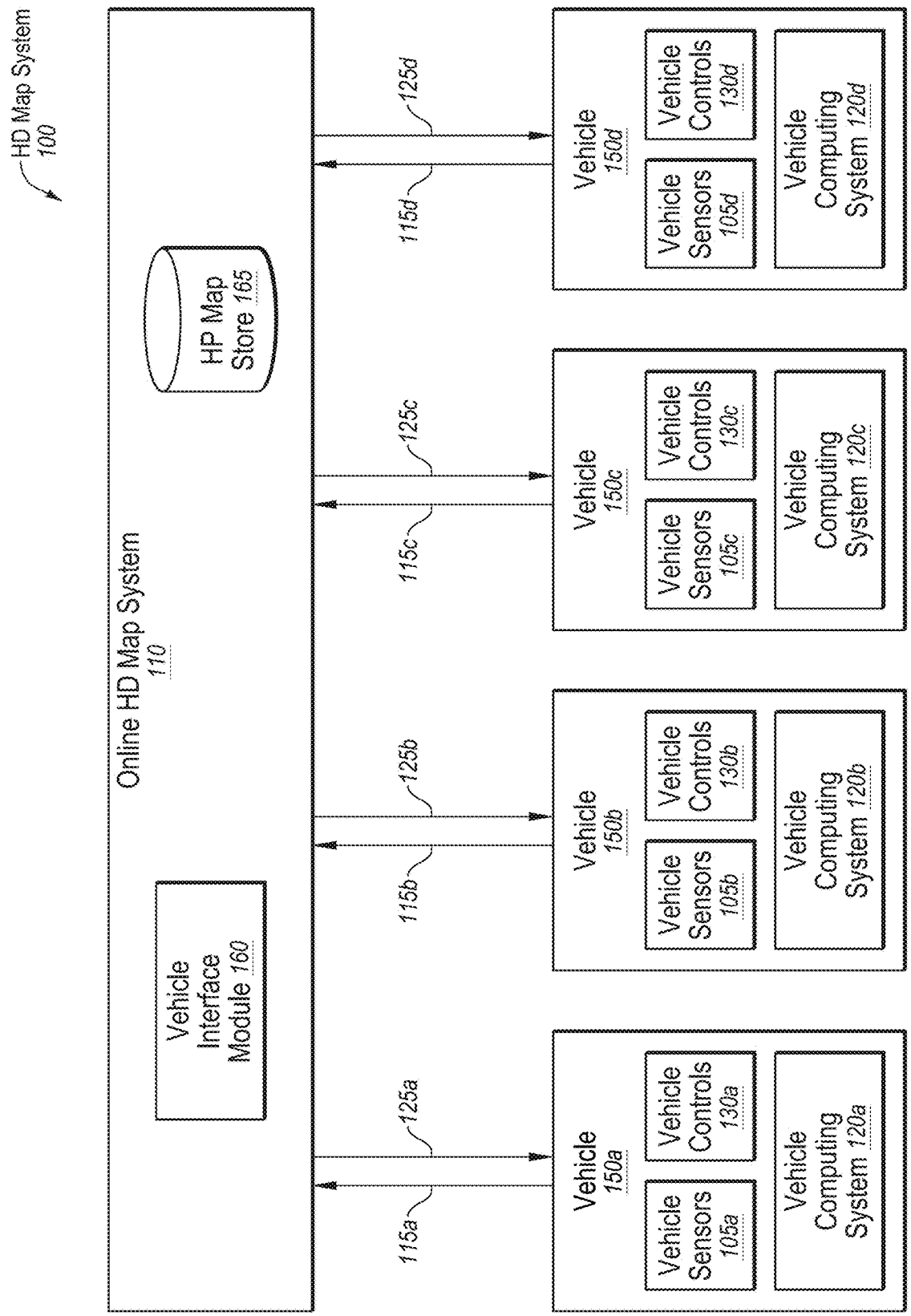
FIG. 1 illustrates an example overall system environment of an HD map system interacting with multiple vehicle computing systems.

Embodiments of the present disclosure may maintain high definition (HD) maps that may include up-to-date information with high accuracy or precision. The HD maps may be used by an autonomous vehicle to safely navigate to various destinations without human input or with limited human input. In the present disclosure reference to "safe navigation" may refer to performance of navigation within a target safety threshold. For example, the target safety threshold may be a certain number of driving hours without an accident. Such thresholds may be set by automotive manufacturers or government agencies. Additionally, reference to "up-to-date" information does not necessarily mean absolutely up-to-date, but up-to-date within a target threshold amount of time. For example, a target threshold amount of time may be one week or less such that a map that reflects any potential changes to a roadway that may have occurred within the past week may be considered "up-to-date". Such target threshold amounts of time may vary anywhere from one month to 1 minute, or possibly even less.

The autonomous vehicle may be a vehicle capable of sensing its environment and navigating without human input. An HD map may refer to a map that may store data with high precision and accuracy, for example, with accuracies of approximately 2-30 cm.

Some embodiments may generate HD maps that may contain spatial geometric information about the roads on which the autonomous vehicle may travel. Accordingly, the generated HD maps may include the information that may allow the autonomous vehicle to navigate safely without human intervention. Some embodiments may gather and use data from the lower resolution sensors of the self-driving vehicle itself as it drives around rather than relying on data that may be collected by an expensive and time-consuming mapping fleet process that may include a fleet of vehicles outfitted with high resolution sensors to create HD maps. The autonomous vehicles may have no prior map data for these routes or even for the region. Some embodiments may provide location as a service (LaaS) such that autonomous vehicles of different manufacturers may gain access to the most up-to-date map information collected, obtained, or created via the aforementioned processes.

Some embodiments may generate and maintain HD maps that may be accurate and may include up-to-date road conditions for safe navigation of the autonomous vehicle. For example, the HD maps may provide the current location of the autonomous vehicle relative to one or more lanes of roads precisely enough to allow the autonomous vehicle to drive safely in and to maneuver safety between one or more lanes of the roads.

HD maps may store a very large amount of information, and therefore may present challenges in the management of the information. For example, an HD map for a given geographic region may be too large to store on a local storage of the autonomous vehicle. Some embodiments may provide a portion of an HD map to the autonomous vehicle that may allow the autonomous vehicle to determine its current location in the HD map, determine the features on the road relative to the autonomous vehicle's position, determine if it is safe to move the autonomous vehicle based on physical constraints and legal constraints, etc. Examples of such physical constraints may include physical obstacles, such as walls, barriers, medians, curbs, etc. and examples of legal constraints may include an allowed direction of travel for a lane, lane restrictions, speed limits, yields, stops, following distances, etc.

Some embodiments of the present disclosure may allow safe navigation for an autonomous vehicle by providing relatively low latency, for example, 5-40 milliseconds or less, for providing a response to a request; high accuracy in terms of location, for example, accuracy within 30 cm or better; freshness of data such that a map may be updated to reflect changes on the road within a threshold time frame, for example, within days, hours, minutes or seconds; and storage efficiency by reducing or minimizing the storage used by the HD Map.

Some embodiments of the present disclosure may enable LIDAR-based detection of traffic signs for navigation of autonomous vehicles. In some embodiments, a system may detect traffic signs using LIDAR scans. A LIDAR signal may be effective in measuring reflectiveness of surfaces. Traffic signs typically have higher reflectivity as compared to other surfaces such as surfaces on trees, buildings, etc. This higher reflectivity may be due to traffic signs being designed to be reflective so that drivers are able to see traffic signs in the light of headlights of a vehicle. In some embodiments, the system may detect a cluster of high intensity points in a point cloud obtained from a LIDAR. The system may determine whether the cluster of high intensity points is a traffic sign. The system may also determine a bounding box around the cluster. The bounding box around the cluster may provide an estimate of the location of the traffic sign. In some embodiments, the system may project the points of the point cloud identified as a traffic sign in the point cloud to an image to confirm whether there is a traffic sign represented by the points. The system may match the object in the image where the bounding box was detected. If the analysis of the image indicates a likelihood of having a traffic sign where the bounding box was identified in the point cloud, the system may determine a high likelihood of a traffic sign being present at that location. In some embodiments, the identifying of a traffic sign based on a higher intensity of the cluster of points in the point cloud captured by the LIDAR sensor may be more accurate than a purely image-based sign detection method.

Embodiments of the present disclosure are explained with reference to the accompanying drawings.

System Environment of HD Map System

FIG. 1 illustrates an example overall system environment of an HD map system 100 that may interact with multiple vehicles, according to one or more embodiments of the present disclosure. The HD map system 100 may comprise an online HD map system 110 that may interact with a plurality of vehicles 150 (e.g., vehicles 150a-d) of the HD map system 100. The vehicles 150 may be autonomous vehicles or non-autonomous vehicles.

The online HD map system 110 may be configured to receive sensor data that may be captured by sensors of the vehicles 150 and combine data received from the vehicles 150 to generate and maintain HD maps. The online HD map system 110 may be configured to send HD map data to the vehicles 150 for use in driving the vehicles 150. In some embodiments, the online HD map system 110 may be implemented as a distributed computing system, for example, a cloud-based service that may allow clients such as a vehicle computing system 120 (e.g., vehicle computing systems 120a-d) to make requests for information and services. For example, a vehicle computing system 120 may make a request for HD map data for driving along a route and the online HD map system 110 may provide the requested HD map data to the vehicle computing system 120.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4A:
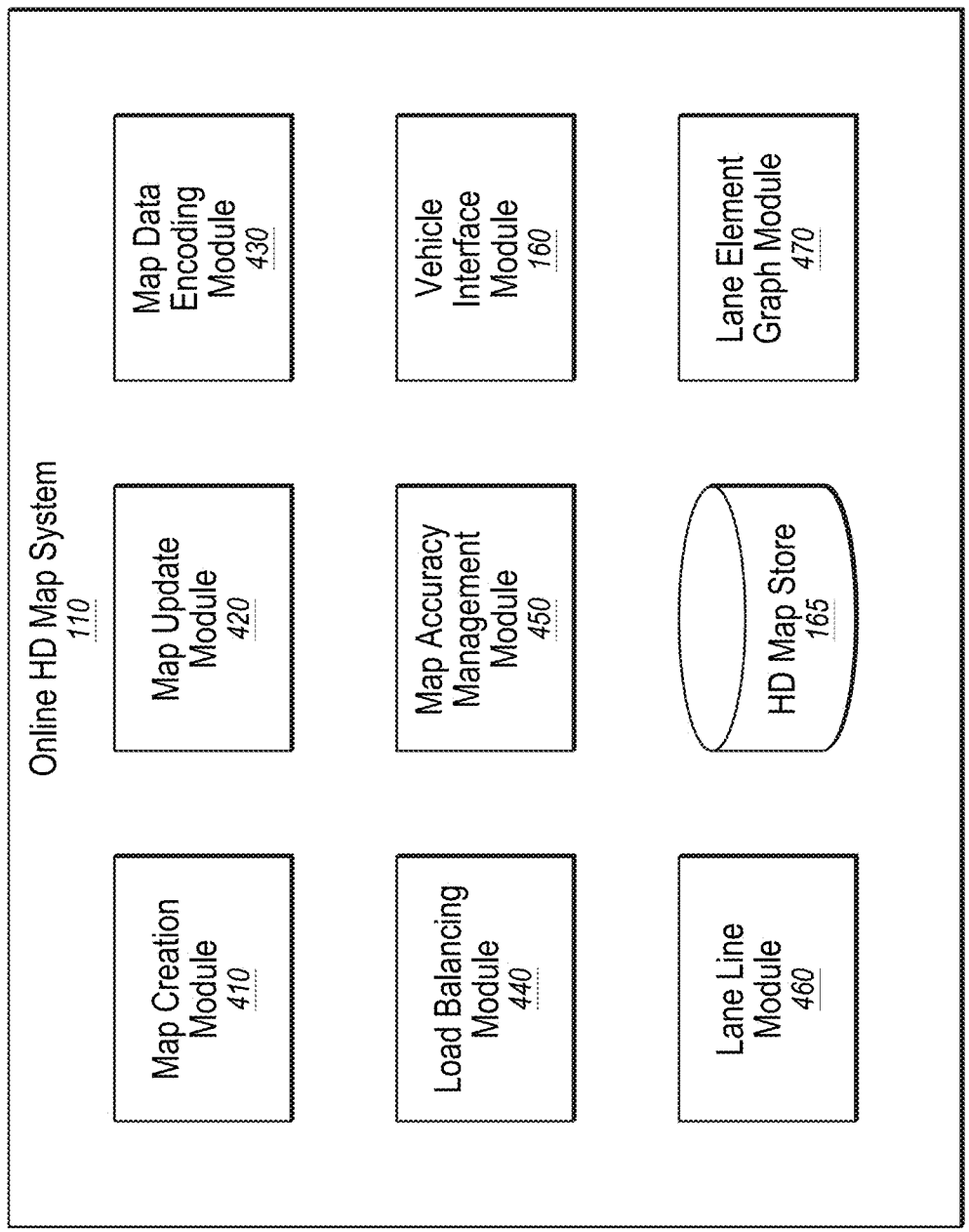
FIG. 4A illustrates an example of system architecture of an online HD map system.

The online HD map system 110 may comprise a vehicle interface module 160 and an HD map store 165. The online HD map system 110 may be configured to interact with the vehicle computing system 120 of various vehicles 150 using the vehicle interface module 160. The online HD map system 110 may be configured to store map information for various geographical regions in the HD map store 165. The online HD map system 110 may be configured to include other modules than those illustrated in FIG. 1, for example, various other modules as illustrated in FIG. 4A and further described herein.

In the present disclosure, a module may include code and routines configured to enable a corresponding system (e.g., a corresponding computing system) to perform one or more of the operations described therewith. Additionally or alternatively, any given module may be implemented using hardware including any number of processors, microprocessors (e.g., to perform or control performance of one or more operations), field-programmable gate arrays (FPGAs), application-specific integrated circuits (ASICs) or any suitable combination of two or more thereof. Alternatively or additionally, any given module may be implemented using a combination of hardware and software. In the present disclosure, operations described as being performed by a module may include operations that the module may direct a corresponding system to perform.

Further, the differentiation and separation of different modules indicated in the present disclosure is to help with explanation of operations being performed and is not meant to be limiting. For example, depending on the implementation, the operations described with respect to two or more of the modules described in the present disclosure may be performed by what may be considered as a same module. Further, the operations of one or more of the modules may be divided among what may be considered one or more other modules or submodules depending on the implementation.

The online HD map system 110 may be configured to receive sensor data collected by sensors of a plurality of vehicles 150, for example, hundreds or thousands of cars. The sensor data may include any data that may be obtained by sensors of the vehicles that may be related to generation of HD maps. For example, the sensor data may include LIDAR data, captured images, etc. Additionally or alternatively, the sensor data may include information that may describe the current state of the vehicle 150, the location and motion parameters of the vehicles 150, etc.

The vehicles 150 may be configured to provide the sensor data 115 that may be captured while driving along various routes and to send it to the online HD map system 110. The online HD map system 110 may be configured to use the sensor data 115 received from the vehicles 150 to create and update HD maps describing the regions in which the vehicles 150 may be driving. The online HD map system 110 may be configured to build high definition maps based on the collective sensor data 115 that may be received from the vehicles 150 and to store the HD map information in the HD map store 165.

The online HD map system 110 may be configured to send HD map data to the vehicles 150 at the request of the vehicles 150.

For example, in instances in which a particular vehicle 150 is scheduled to drive along a route, the particular vehicle computing system 120 of the particular vehicle 150 may be configured to provide information describing the route being travelled to the online HD map system 110. In response, the online HD map system 110 may be configured to provide HD map data of HD maps related to the route (e.g., that represent the area that includes the route) that may facilitate navigation and driving along the route by the particular vehicle 150.

In an embodiment, the online HD map system 110 may be configured to send portions of the HD map data to the vehicles 150 in a compressed format so that the data transmitted may consume less bandwidth. The online HD map system 110 may be configured to receive from various vehicles 150, information describing the HD map data that may be stored at a local HD map store (e.g., the local HD map store 275 of FIG. 2) of the vehicles 150.

In some embodiments, the online HD map system 110 may determine that the particular vehicle 150 may not have certain portions of the HD map data stored locally in a local HD map store of the particular vehicle computing system 120 of the particular vehicle 150. In these or other embodiments, in response to such a determination, the online HD map system 110 may be configured to send a particular portion of the HD map data to the vehicle 150.

In some embodiments, the online HD map system 110 may determine that the particular vehicle 150 may have previously received HD map data with respect to the same geographic area as the particular portion of the HD map data. In these or other embodiments, the online HD map system 110 may determine that the particular portion of the HD map data may be an updated version of the previously received HD map data that was updated by the online HD map system 110 since the particular vehicle 150 last received the previous HD map data. In some embodiments, the online HD map system 110 may send an update for that portion of the HD map data that may be stored at the particular vehicle 150. This may allow the online HD map system 110 to reduce or minimize the amount of HD map data that may be communicated with the vehicle 150 and also to keep the HD map data stored locally in the vehicle updated on a regular basis.

The vehicle 150 may include vehicle sensors 105 (e.g., vehicle sensors 105a-d), vehicle controls 130 (e.g., vehicle controls 130a-d), and a vehicle computing system 120 (e.g., vehicle computer systems 120a-d). The vehicle sensors 105 may be configured to detect the surroundings of the vehicle 150. In these or other embodiments, the vehicle sensors 105 may detect information describing the current state of the vehicle 150, for example, information describing the location and motion parameters of the vehicle 150.

The vehicle sensors 105 may comprise a camera, a light detection and ranging sensor (LIDAR), a global navigation satellite system (GNSS) receiver, for example, a global positioning system (GPS) navigation system, an inertial measurement unit (IMU), and others. The vehicle sensors 105 may include one or more cameras that may capture images of the surroundings of the vehicle. A LIDAR may survey the surroundings of the vehicle by measuring distance to a target by illuminating that target with a laser light pulses and measuring the reflected pulses. The GPS navigation system may determine the position of the vehicle 150 based on signals from satellites. The IMU may include an electronic device that may be configured to measure and report motion data of the vehicle 150 such as velocity, acceleration, direction of movement, speed, angular rate, and so on using a combination of accelerometers and gyroscopes or other measuring instruments.

The vehicle controls 130 may be configured to control the physical movement of the vehicle 150, for example, acceleration, direction change, starting, stopping, etc. The vehicle controls 130 may include the machinery for controlling the accelerator, brakes, steering wheel, etc. The vehicle computing system 120 may provide control signals to the vehicle controls 130 on a regular and/or continuous basis and may cause the vehicle 150 to drive along a selected route.

The vehicle computing system 120 may be configured to perform various tasks including processing data collected by the sensors as well as map data received from the online HD map system 110. The vehicle computing system 120 may also be configured to process data for sending to the online HD map system 110. An example of the vehicle computing system 120 is further illustrated in FIG. 2 and further described in connection with FIG. 2.

The interactions between the vehicle computing systems 120 and the online HD map system 110 may be performed via a network, for example, via the Internet. The network may be configured to enable communications between the vehicle computing systems 120 and the online HD map system 110. In some embodiments, the network may be configured to utilize standard communications technologies and/or protocols. The data exchanged over the network may be represented using technologies and/or formats including the hypertext markup language (HTML), the extensible markup language (XML), etc. In addition, all or some of links may be encrypted using conventional encryption technologies such as secure sockets layer (SSL), transport layer security (TLS), virtual private networks (VPNs), Internet Protocol security (IPsec), etc. In some embodiments, the entities may use custom and/or dedicated data communications technologies.

Vehicle Computing System

Figure 2:
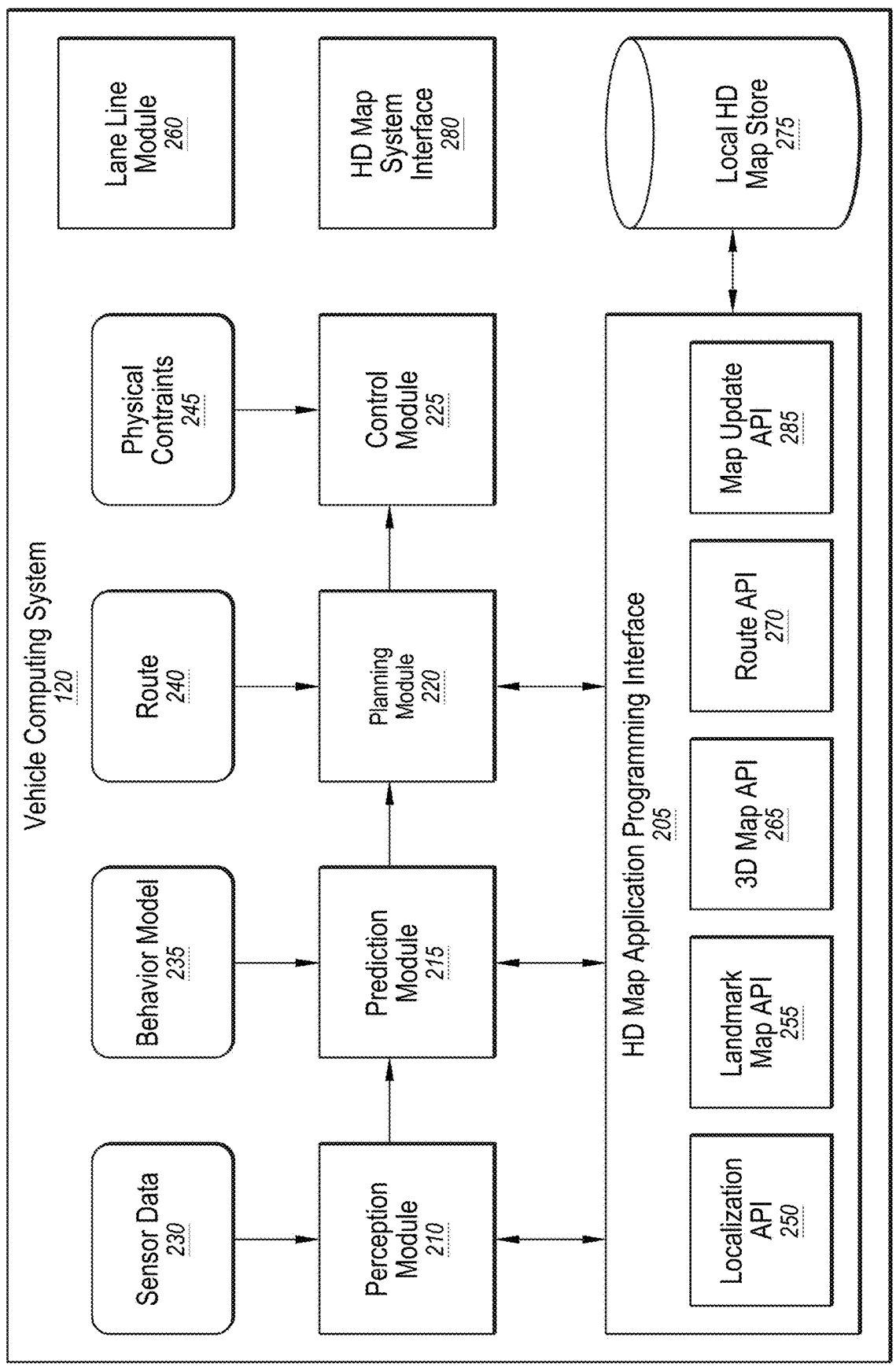
FIG. 2 illustrates an example system architecture of a vehicle computing system.

FIG. 2 illustrates an example system architecture of the vehicle computing system 120. The vehicle computing system 120 may include a perception module 210, a prediction module 215, a planning module 220, a control module 225, a lane line module 260, a local HD map store 275, an HD map system interface 280, and an HD map application programming interface (API) 205. The various modules of the vehicle computing system 120 may be configured to process various types of data including sensor data 230, a behavior model 235, routes 240, and physical constraints 245. In some embodiments, the vehicle computing system 120 may contain more or fewer modules. The functionality described as being implemented by a particular module may be implemented by other modules.

With reference to FIG. 2 and FIG. 1, in some embodiments, the vehicle computing system 120 may include a perception module 210. The perception module 210 may be configured to receive sensor data 230 from the vehicle sensors 105 of the vehicles 150. The sensor data 230 may include data collected by cameras of the car, LIDAR, IMU, GPS navigation system, etc. The perception module 210 may also be configured to use the sensor data 230 to determine what objects are around the corresponding vehicle 150, the details of the road on which the corresponding vehicle 150 is travelling, etc. In addition, the perception module 210 may be configured to process the sensor data 230 to populate data structures storing the sensor data 230 and to provide the information or instructions to a prediction module 215 of the vehicle computing system 120.

The prediction module 215 may be configured to interpret the data provided by the perception module 210 using behavior models of the objects perceived to determine whether an object may be moving or likely to move. For example, the prediction module 215 may determine that objects representing road signs may not be likely to move, whereas objects identified as vehicles, people, etc., may either be in motion or likely to move. The prediction module 215 may also be configured to use behavior models 235 of various types of objects to determine whether they may be likely to move. In addition, the prediction module 215 may also be configured to provide the predictions of various objects to a planning module 200 of the vehicle computing system 120 to plan the subsequent actions that the corresponding vehicle 150 may take next.

The planning module 200 may be configured to receive information describing the surroundings of the corresponding vehicle 150 from the prediction module 215 and a route 240 that may indicate a destination of the vehicle 150 and that may indicate the path that the vehicle 150 may take to get to the destination.

The planning module 200 may also be configured to use the information from the prediction module 215 and the route 240 to plan a sequence of actions that the vehicle 150 may to take within a short time interval, for example, within the next few seconds. In some embodiments, the planning module 200 may be configured to specify a sequence of actions as one or more points representing nearby locations that the corresponding vehicle 150 may drive through next. The planning module 200 may be configured to provide, to the control module 225, the details of a plan comprising the sequence of actions to be taken by the corresponding vehicle 150. The plan may indicate the subsequent action or actions of the corresponding vehicle 150, for example, whether the corresponding vehicle 150 may perform a lane change, a turn, an acceleration by increasing the speed or slowing down, etc.

The control module 225 may be configured to determine the control signals that may be sent to the vehicle controls 130 of the corresponding vehicle 150 based on the plan that may be received from the planning module 200. For example, if the corresponding vehicle 150 is currently at point A and the plan specifies that the corresponding vehicle 150 should next proceed to a nearby point B, the control module 225 may determine the control signals for the vehicle controls 130 that may cause the corresponding vehicle 150 to go from point A to point B in a safe and smooth way, for example, without taking any sharp turns or a zig zag path from point A to point B. The path that may be taken by the corresponding vehicle 150 to go from point A to point B may depend on the current speed and direction of the corresponding vehicle 150 as well as the location of point B with respect to point A. For example, if the current speed of the corresponding vehicle 150 is high, the corresponding vehicle 150 may take a wider turn compared to another vehicle driving slowly.

The control module 225 may also be configured to receive physical constraints 245 as input. The physical constraints 245 may include the physical capabilities of the corresponding vehicle 150. For example, the corresponding vehicle 150 having a particular make and model may be able to safely make certain types of vehicle movements such as acceleration and turns that another vehicle with a different make and model may not be able to make safely. In addition, the control module 225 may be configured to incorporate the physical constraints 245 in determining the control signals for the vehicle controls 130 of the corresponding vehicle 150. In addition, the control module 225 may be configured to send control signals to the vehicle controls 130 that may cause the corresponding vehicle 150 to execute the specified sequence of actions and may cause the corresponding vehicle 150 to move according to a predetermined set of actions. In some embodiments, the aforementioned steps may be constantly repeated every few seconds and may cause the corresponding vehicle 150 to drive safely along the route that may have been planned for the corresponding vehicle 150.

The various modules of the vehicle computing system 120 including the perception module 210, prediction module 215, and planning module 220 may be configured to receive map information to perform their respective computations. The corresponding vehicle 150 may store the HD map data in the local HD map store 275. The modules of the vehicle computing system 120 may interact with the map data using an HD map API 205.

The HD map API 205 may provide one or more application programming interfaces (APIs) that can be invoked by a module for accessing the map information. The HD map system interface 280 may be configured to allow the vehicle computing system 120 to interact with the online HD map system 110 via a network (not illustrated in the Figures). The local HD map store 275 may store map data in a format that may be specified by the online HD map system 110. The HD map API 205 may be configured to process the map data format as provided by the online HD map system 110. The HD map API 205 may be configured to provide the vehicle computing system 120 with an interface for interacting with the HD map data. The HD map API 205 may include several APIs including a localization API 250, a landmark map API 255, a 3D map API 265, a route API 270, a map update API 285, etc.

The localization API 250 may be configured to determine the current location of the corresponding vehicle 150, for example, where the corresponding vehicle 150 is with respect to a given route. The localization API 250 may be configured to include a localized API that determines a location of the corresponding vehicle 150 within an HD map and within a particular degree of accuracy. The vehicle computing system 120 may also be configured to use the location as an accurate (e.g., within a certain level of accuracy) relative position for making other queries, for example, feature queries, navigable space queries, and occupancy map queries further described herein.

The localization API 250 may be configured to receive inputs comprising one or more of, location provided by GPS, vehicle motion data provided by IMU, LIDAR scanner data, camera images, etc. The localization API 250 may be configured to return an accurate location of the corresponding vehicle 150 as latitude and longitude coordinates. The coordinates that may be returned by the localization API 250 may be more accurate compared to the GPS coordinates used as input, for example, the output of the localization API 250 may have precision ranging within from 2-30 cm. In some embodiments, the vehicle computing system 120 may be configured to invoke the localization API 250 to determine the location of the corresponding vehicle 150 periodically based on the LIDAR using scanner data, for example, at a frequency of 10 Hertz (Hz).

The vehicle computing system 120 may also be configured to invoke the localization API 250 to determine the vehicle location at a higher rate (e.g., 60 Hz) if GPS or IMU data is available at that rate. In addition, vehicle computing system 120 may be configured to store as internal state, location history records to improve accuracy of subsequent localization calls. The location history record may store history of location from the point-in-time, when the corresponding vehicle 150 was turned off/stopped, etc. The localization API 250 may include a localize-route API that may be configured to generate an accurate (e.g., within a specified degree of accuracy) route specifying lanes based on the HD maps. The localize-route API may be configured to receive as input a route from a source to a destination via one or more third-party maps and may be configured to generate a high precision (e.g., within a specified degree of precision such as within 30 cm) route represented as a connected graph of navigable lanes along the input routes based on HD maps.

The landmark map API 255 may be configured to provide a geometric and semantic description of the world around the corresponding vehicle 150, for example, description of various portions of lanes that the corresponding vehicle 150 is currently travelling on. The landmark map APIs 255 comprise APIs that may be configured to allow queries based on landmark maps, for example, fetch-lanes API and fetch-features API. The fetch-lanes API may be configured to provide lane information relative to the corresponding vehicle 150 and the fetch-features API. The fetch-lanes API may also be configured to receive, as input, a location, for example, the location of the corresponding vehicle 150 specified using latitude and longitude and return lane information relative to the input location. In addition, the fetch-lanes API may be configured to specify a distance parameter indicating the distance relative to the input location for which the lane information may be retrieved. Further, the fetch-features API may be configured to receive information identifying one or more lane elements and to return landmark features relative to the specified lane elements. The landmark features may include, for each landmark, a spatial description that may be specific to the type of landmark.

The 3D map API 265 may be configured to provide access to the spatial 3-dimensional (3D) representation of the road and various physical objects around the road as stored in the local HD map store 275. The 3D map APIs 265 may include a fetch-navigable-surfaces API and a fetch-occupancy-grid API. The fetch-navigable-surfaces API may be configured to receive as input identifiers for one or more lane elements and return navigable boundaries for the specified lane elements. The fetch-occupancy-grid API may also be configured to receive a location as input, for example, a latitude and a longitude of the corresponding vehicle 150, and return information describing occupancy for the surface of the road and all objects available in the HD map near the location.

The information describing occupancy may include a hierarchical volumetric grid of some or all positions considered occupied in the HD map. The occupancy grid may include information at a high resolution near the navigable areas, for example, at curbs and bumps, and relatively low resolution in less significant areas, for example, trees and walls beyond a curb. In addition, the fetch-occupancy-grid API may be configured to detect obstacles and to change direction, if necessary.

The 3D map APIs 265 may also include map-update APIs, for example, download-map-updates API and upload-map-updates API. The download-map-updates API may be configured to receive as input a planned route identifier and download map updates for data relevant to all planned routes or for a specific planned route. The upload-map-updates API may be configured to upload data collected by the vehicle computing system 120 to the online HD map system 110. The upload-map-updates API may allow the online HD map system 110 to keep the HD map data stored in the online HD map system 110 up-to-date based on changes in map data that may be observed by sensors of vehicles 150 driving along various routes.

The route API 270 may be configured to return route information including a full route between a source and destination and portions of a route as the corresponding vehicle 150 travels along the route. The 3D map API 265 may be configured to allow querying of the online HD map system 110. The route APIs 270 may include an add-planned-routes API and a get-planned-route API. The add-planned-routes API may be configured to provide information describing planned routes to the online HD map system 110 so that information describing relevant HD maps may be downloaded by the vehicle computing system 120 and kept up to date. The add-planned-routes API may be configured to receive as input, a route specified using polylines expressed in terms of latitudes and longitudes and also a time-to-live (TTL) parameter specifying a time period after which the route data may be deleted. Accordingly, the add-planned-routes API may be configured to allow the vehicle 150 to indicate the route the vehicle 150 is planning on taking in the near future as an autonomous trip. The add-planned-route API may also be configured to align the route to the HD map, record the route and its TTL value, and determine that the HD map data for the route stored in the vehicle computing system 120 is up-to-date. The get-planned-routes API may be configured to return a list of planned routes and to provide information describing a route identified by a route identifier.

The map update API 285 may be configured to manage operations related to updating of map data, both for the local HD map store 275 and for the HD map store 165 stored in the online HD map system 110. Accordingly, modules in the vehicle computing system 120 may be configured to invoke the map update API 285 for downloading data from the online HD map system 110 to the vehicle computing system 120 for storing in the local HD map store 275. The map update API 285 may also be configured to allow the vehicle computing system 120 to determine whether the information monitored by the vehicle sensors 105 indicates a discrepancy in the map information provided by the online HD map system 110 and upload data to the online HD map system 110 that may result in the online HD map system 110 updating the map data stored in the HD map store 165 that is provided to other vehicles 150.

Figure 3:
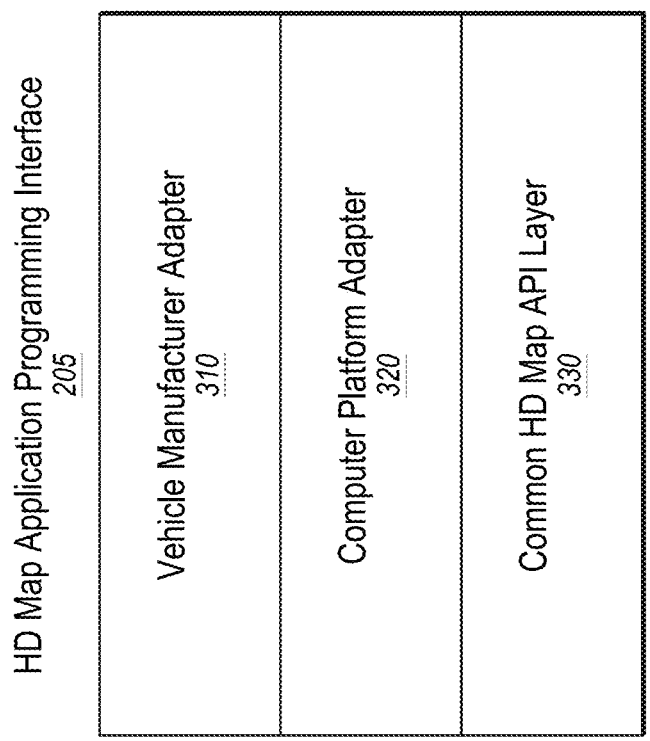
FIG. 3 illustrates an example of various layers of instructions in an HD map application programming interface of a vehicle computing system.

FIG. 3 illustrates an example of various layers of instructions in the HD map API 205 of the vehicle computing system 120. Different manufacturers of vehicles may have different procedures or instructions for receiving information from vehicle sensors 105 and for controlling the vehicle controls 130. Furthermore, different vendors may provide different computer platforms with autonomous driving capabilities, for example, collection and analysis of vehicle sensor data. Examples of a computer platform for autonomous vehicles include platforms provided vendors, such as NVIDIA, QUALCOMM, and INTEL. These platforms may provide functionality for use by autonomous vehicle manufacturers in the manufacture of autonomous vehicles 150. A vehicle manufacturer may use any one or several computer platforms for autonomous vehicles 150.

The online HD map system 110 may be configured to provide a library for processing HD maps based on instructions specific to the manufacturer of the vehicle and instructions specific to a vendor specific platform of the vehicle. The library may provide access to the HD map data and may allow the vehicle 150 to interact with the online HD map system 110.

As illustrated in FIG. 3, the HD map API 205 may be configured to be implemented as a library that includes a vehicle manufacturer adapter 310, a computer platform adapter 320, and a common HD map API layer 330. The common HD map API layer 330 may be configured to include generic instructions that may be used across a plurality of vehicle computer platforms and vehicle manufacturers. The computer platform adapter 320 may be configured to include instructions that may be specific to each computer platform. For example, the common HD map API layer 330 may be configured to invoke the computer platform adapter 320 to receive data from sensors supported by a specific computer platform. The vehicle manufacturer adapter 310 may be configured to include instructions specific to a vehicle manufacturer. For example, the common HD map API layer 330 may be configured to invoke functionality provided by the vehicle manufacturer adapter 310 to send specific control instructions to the vehicle controls 130.

The online HD map system 110 may be configured to store computer platform adapters 320 for a plurality of computer platforms and vehicle manufacturer adapters 310 for a plurality of vehicle manufacturers. The online HD map system 110 may be configured to determine the particular vehicle manufacturer and the particular computer platform for a specific autonomous vehicle 150. The online HD map system 110 may also be configured to select the vehicle manufacturer adapter 310 for the particular vehicle manufacturer and the computer platform adapter 320 the particular computer platform of that specific vehicle 150. In addition, the online HD map system 110 may be configured to send instructions of the selected vehicle manufacturer adapter 310 and the selected computer platform adapter 320 to the vehicle computing system 120 of that specific autonomous vehicle. The vehicle computing system 120 of that specific autonomous vehicle may be configured to install the received vehicle manufacturer adapter 310 and the computer platform adapter 320. The vehicle computing system 120 may also be configured to periodically verify whether the online HD map system 110 has an update to the installed vehicle manufacturer adapter 310 and the computer platform adapter 320. In addition, if a more recent update is available compared to the version installed on the vehicle 150, the vehicle computing system 120 may be configured to request and receive the latest update and to install it.

HD Map System Architecture

FIG. 4A illustrates an example system architecture of the online HD map system 110. The online HD map system 110 may be configured to include a map creation module 410, a map update module 420, a map data encoding module 430, a load balancing module 440, a map accuracy management module 450, a lane line module 460, lane element graph module 470, the vehicle interface module 160, and the HD map store 165. Some embodiments of online HD map system 110 may be configured to include more or fewer modules than shown in FIG. 4A. Functionality indicated as being performed by a particular module may be implemented by other modules. In some embodiments, the online HD map system 110 may be configured to be a distributed system comprising a plurality of processing systems.

The map creation module 410 may be configured to create HD map data of HD maps from the sensor data collected from several vehicles 150 that are driving along various routes. The map update module 420 may be configured to update previously computed HD map data by receiving more recent information (e.g., sensor data) from vehicles 150 that recently travelled along routes on which map information changed. For example, certain road signs may have changed or lane information may have changed as a result of construction in a region, and the map update module 420 may be configured to update the HD maps and corresponding HD map data accordingly. The map data encoding module 430 may be configured to encode the HD map data to be able to store the data efficiently (e.g., compress the HD map data) as well as send the HD map data to vehicles 150. The load balancing module 440 may be configured to balance loads across vehicles 150 such that requests to receive data from vehicles 150 are distributed across different vehicles 150 in a relatively uniform manner (e.g., the load distribution between different vehicles 150 is within a threshold amount of each other). The map accuracy management module 450 may be configured to maintain relatively high accuracy of the HD map data using various techniques even though the information received from individual vehicles may not have the same degree of accuracy. The lane element graph module 470 may be configured to generate lane element graphs (i.e., a connected network of lane elements) to allow navigation of autonomous vehicles through a mapped area.

Figure 4B:
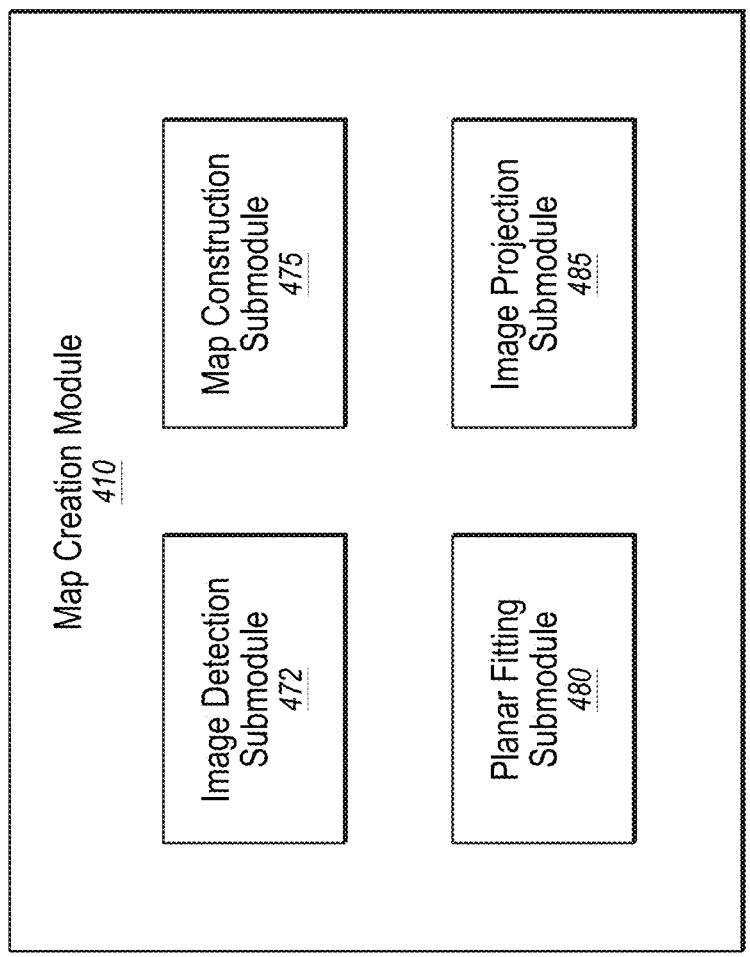
FIG. 4B illustrates an example of system architecture of a map creation module.

FIG. 4B illustrates an example of system architecture of the map creation module of FIG. 4A. The map creation module 410 may be configured to create the HD map from map data collected from several vehicles. In some embodiments, the map creation module 410 may include an image detection submodule 472, a 3D map construction submodule 475, a planar fitting submodule 480, and an image projection submodule 485, which are utilized to store traffic signs in the map. In some embodiments, the map creation module 410 may include additional or fewer submodules for the purpose of creating the HD map. Upon creating the HD map, the map creation module 410 may transmit the HD map to be stored by the HD map store 165 of FIG. 1.

The image detection submodule 472 may be configured to identify a traffic sign in an image. The image detection submodule 472 may receive at least one image from at least one camera (e.g., the vehicle sensor 105 of FIG. 1) mounted on at least one vehicle (e.g., the vehicle 150a of FIG. 1). The image may contain a traffic sign. The image detection submodule 472 may receive the image and identify the portion of the image corresponding to the traffic sign. In some embodiments, the image detection submodule 472 may apply one or more models for classifying the traffic sign with a plurality of attributes. Attributes may include a type of the sign, text on the traffic sign, color of the traffic sign, limitations of the traffic sign, etc. The classified attributes may be stored in the HD map describing the identified traffic sign.

The map construction submodule 475 may be configured to construct the HD map from a depth map. The map construction submodule 475 may receive at least one depth map from at least one detection and ranging sensor (e.g., the vehicle sensor 105a of FIG. 1) mounted on at least one vehicle (e.g., the vehicle 150a of FIG. 1). The depth map may contain a plurality of points displayed in two-dimensions wherein each point describes a distance of an exterior surface of a physical object from the detection and ranging sensor. The map construction submodule 475 may translate each point into a position vector of the exterior surface of the physical object. The map construction submodule 475 may translate a point's position in the depth map into a direction of the position vector from the detection and ranging sensor. The map construction submodule 475 may translate the point's distance into the magnitude of the position vector from the detection and ranging sensor. In some embodiments, the map construction submodule 475 may receive multiple depth maps and combine all translated position vectors to construct the map in three dimensions. For example, the map construction submodule 475 may receive multiple LIDAR scans and then merges the multiple LIDAR scans into a point cloud that is a 3D mapping of all translated position vectors from the multiple LIDAR scans. In some embodiments, the map construction submodule 475 may merges multiple LIDAR scans taken in quick succession and/or taken from relatively proximal positions.

The planar fitting submodule 480 may be configured to fit a plane corresponding to the traffic sign in the map. The planar fitting submodule 480 may utilize at least one depth map containing the traffic sign to identify a subset of at least three points corresponding to the traffic sign. In some embodiments, the planar fitting submodule 480 may utilize a depth map which the map construction submodule 475 may utilize to construct the map. The planar fitting submodule 480 may utilize the identified subset of at least three points and likewise identify the corresponding position vectors in the map. The planar fitting submodule 480 may fit a plane in the map based in part on the position vectors in the map and the plane corresponding to a spatial position of the traffic sign in the map.

The image projection submodule 485 may be configured to project the portion of the image of the traffic sign in the map. The image projection submodule 485 may take the identified portion of the image corresponding to the traffic sign from the image detection submodule 472. The image projection submodule 485 may process the portion of the image corresponding to the traffic sign. Processing of the portion of the image corresponding to the traffic sign may comprise editing the portion of the image, adjusting dimensions of the portion of the image, improving resolution of the portion of the image, some other image-processing process, or some combination thereof. The image projection submodule 485 may project the processed portion of the image in the map by placing the processed portion of the image on the fitted plane in the map corresponding to the traffic sign.

Figure 5:
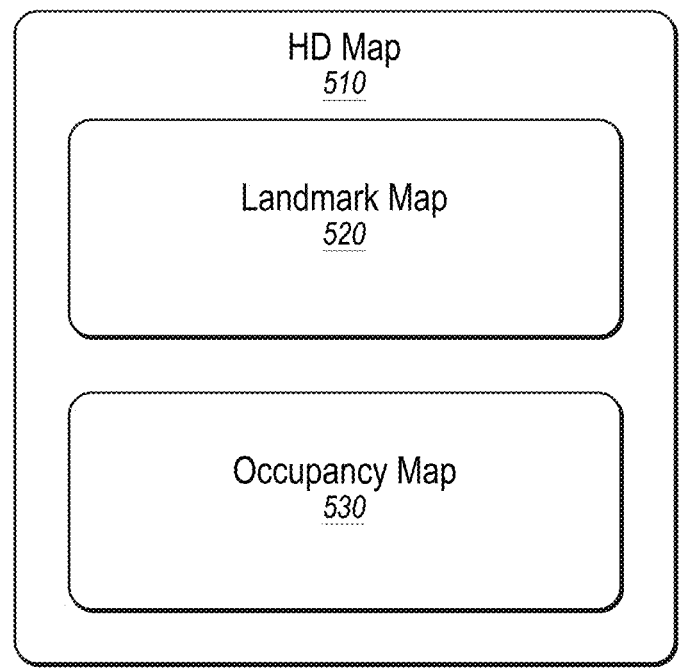
FIG. 5 illustrates example components of an HD map.

FIG. 5 illustrates example components of an HD map 510. The HD map 510 may include HD map data of maps of several geographical regions. In the present disclosure, reference to a map or an HD map, such as HD map 510, may include reference to the map data that corresponds to such map. Further, reference to information of a respective map may also include reference to the map data of that map.

In some embodiments, the HD map 510 of a geographical region may include a landmark map (LMap) 520 and an occupancy map (OMap) 530. The landmark map 520 may comprise information describing lanes including spatial location of lanes and semantic information about each lane. The spatial location of a lane may comprise the geometric location in latitude, longitude, and elevation at high prevision, for example, precision within 30 cm or better. The semantic information of a lane comprises restrictions such as direction, speed, type of lane (for example, a lane for going straight, a left turn lane, a right turn lane, an exit lane, and the like), restriction on crossing to the left, connectivity to other lanes, etc.

In these or other embodiments, the landmark map 520 may comprise information describing stop lines, yield lines, spatial location of cross walks, safely navigable space, spatial location of speed bumps, curb, road signs comprising spatial location, type of all signage that is relevant to driving restrictions, etc. Examples of road signs described in an HD map 510 may include stop signs, traffic lights, speed limits, one-way, do-not-enter, yield (vehicle, pedestrian, animal), etc.

In some embodiments, the occupancy map 530 may comprise a spatial 3-dimensional (3D) representation of the road and physical objects around the road. The data stored in an occupancy map 530 may also be referred to herein as occupancy grid data. The 3D representation may be associated with a confidence score indicative of a likelihood of the object existing at the location. The occupancy map 530 may be represented in a number of other ways. In some embodiments, the occupancy map 530 may be represented as a 3D mesh geometry (collection of triangles) which may cover the surfaces. In some embodiments, the occupancy map 530 may be represented as a collection of 3D points which may cover the surfaces. In some embodiments, the occupancy map 530 may be represented using a 3D volumetric grid of cells at 5-10 cm resolution. Each cell may indicate whether or not a surface exists at that cell, and if the surface exists, a direction along which the surface may be oriented.

The occupancy map 530 may take a large amount of storage space compared to a landmark map 520. For example, data of 1 GB/Mile may be used by an occupancy map 530, resulting in the map of the United States (including 4 million miles of road) occupying $4 \times 10^{15}$ bytes or 4 petabytes. Therefore, the online HD map system 110 and the vehicle computing system 120 may use data compression techniques to be able to store and transfer map data thereby reducing storage and transmission costs. Accordingly, the techniques disclosed herein may help improve the self-driving of autonomous vehicles by improving the efficiency of data storage and transmission with respect to self-driving operations and capabilities.

In some embodiments, the HD map 510 does may not use or rely on data that may typically be included in maps, such as addresses, road names, ability to geo-code an address, and ability to compute routes between place names or addresses. The vehicle computing system 120 or the online HD map system 110 may access other map systems, for example, GOOGLE MAPS, to obtain this information. Accordingly, a vehicle computing system 120 or the online HD map system 110 may receive navigation instructions from a tool such as GOOGLE MAPS into a route and may convert the information to a route based on the HD map 510 or may convert the information such that it may be compatible for us on the HD map 510.

Geographical Regions in HD Maps

The online HD map system 110 may divide a large physical area into geographical regions and may store a representation of each geographical region. Each geographical region may represent a contiguous area bounded by a geometric shape, for example, a rectangle or square. In some embodiments, the online HD map system 110 may divide a physical area into geographical regions of similar size independent of the amount of data needed to store the representation of each geographical region. In some embodiments, the online HD map system 110 may divide a physical area into geographical regions of different sizes, where the size of each geographical region may be determined based on the amount of information needed for representing the geographical region. For example, a geographical region representing a densely populated area with a large number of streets may represent a smaller physical area compared to a geographical region representing sparsely populated area with very few streets. In some embodiments, the online HD map system 110 may determine the size of a geographical region based on an estimate of an amount of information that may be used to store the various elements of the physical area relevant for the HD map.

In some embodiments, the online HD map system 110 may represent a geographic region using an object or a data record that may include various attributes including: a unique identifier for the geographical region; a unique name for the geographical region; a description of the boundary of the geographical region, for example, using a bounding box of latitude and longitude coordinates; and a collection of landmark features and occupancy grid data.

Figure 6A:
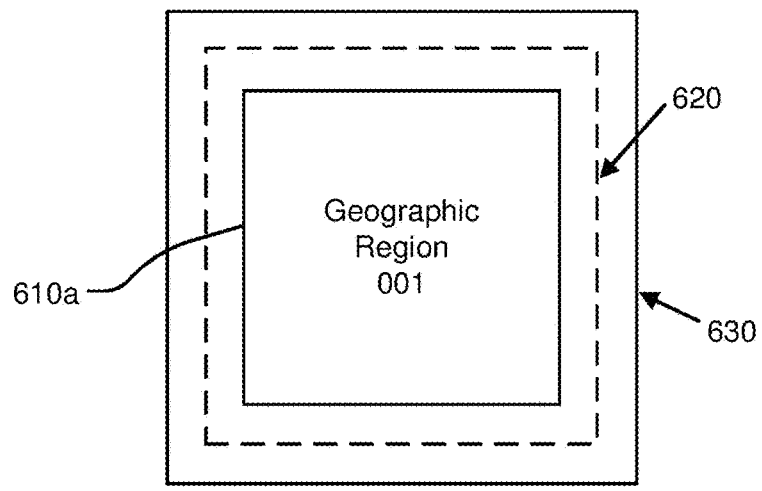
FIGS. 6A-6B illustrate example geographical regions defined in an HD map.
Figure 6B:
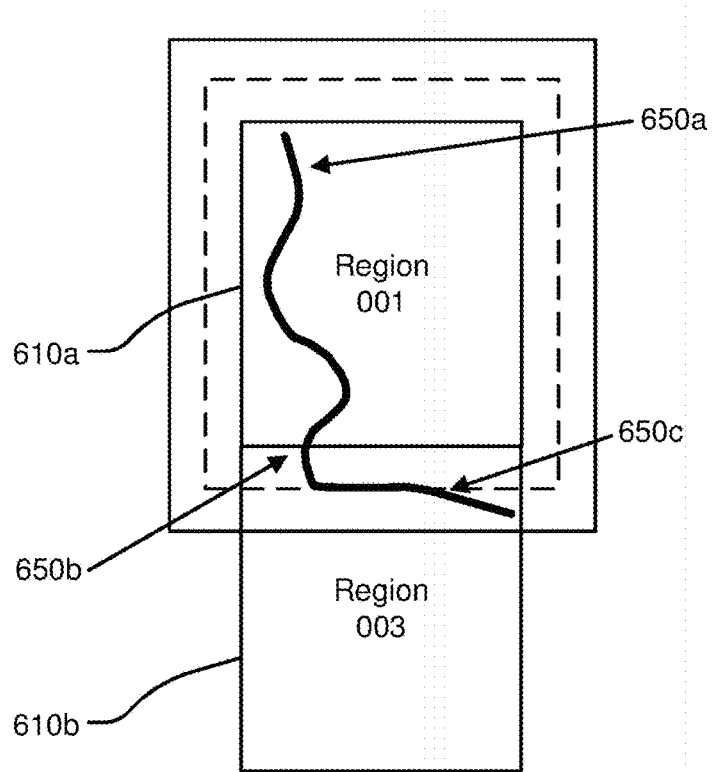

FIGS. 6A-6B illustrate example geographical regions 610a and 610b that may be defined in an HD map according to one or more embodiments. FIG. 6A illustrates a square geographical region 610a. FIG. 6B illustrates two neighboring geographical regions 610a and 610b. The online HD map system 110 may store data in a representation of a geographical region that may allow for transitions from one geographical region to another as a vehicle 150 drives across geographical region boundaries.

In some embodiments, as illustrated in FIG. 6, each geographic region may include a buffer of a predetermined width around it. The buffer may comprise redundant map data around one or more sides e of a geographic region. In these or other embodiments, the buffer may be around every side of a particular geographic region. Therefore, in some embodiments, where the geographic region may be a certain shape, the geographic region may be bounded by a buffer that may be a larger version of that shape. By way of example, FIG. 6A illustrates a boundary 620 for a buffer of approximately 50 m around the geographic region 610a and a boundary 630 for a buffer of approximately 100 m around the geographic region 610a.

In some embodiments, the vehicle computing system 120 may switch the current geographical region of the corresponding vehicle 150 from one geographical region to a neighboring geographical region when the corresponding vehicle 150 crosses a predetermined threshold distance within the buffer. For example, as shown in FIG. 6B, the corresponding vehicle 150 may start at location 650a in the geographical region 610a. The corresponding vehicle 150 may traverse along a route to reach a location 650b where it may cross the boundary of the geographical region 610 but may stay within the boundary 620 of the buffer. Accordingly, the vehicle computing system 120 of the corresponding vehicle 150 may continue to use the geographical region 610a as the current geographical region of the vehicle. Once the corresponding vehicle 150 crosses the boundary 620 of the buffer at location 650*c*, the vehicle computing system 120 may switch the current geographical region of the corresponding vehicle 150 to geographical region 610*b* from geographical region 610*a*. The use of a buffer may reduce or prevent rapid switching of the current geographical region of a vehicle 150 as a result of the vehicle 150 travelling along a route that may closely track a boundary of a geographical region.

Lane Representations in HD Maps

The HD map system 100 may represent lane information of streets in HD maps. Although the embodiments described may refer to streets, the techniques may be applicable to highways, alleys, avenues, boulevards, paths, etc., on which vehicles 150 may travel. The HD map system 100 may use lanes as a reference frame for purposes of routing and for localization of the vehicle 150. The lanes represented by the HD map system 100 may include lanes that are explicitly marked, for example, white and yellow striped lanes, lanes that may be implicit, for example, on a country road with no lines or curbs but may nevertheless have two directions of travel, and implicit paths that may act as lanes, for example, the path that a turning car may make when entering a lane from another lane.

The HD map system 100 may also store information relative to lanes, for example, landmark features such as road signs and traffic lights relative to the lanes, occupancy grids relative to the lanes for obstacle detection, and navigable spaces relative to the lanes so the vehicle 150 may plan/react in emergencies when the vehicle 150 makes an unplanned move out of the lane. Accordingly, the HD map system 100 may store a representation of a network of lanes to allow the vehicle 150 to plan a legal path between a source and a destination and to add a frame of reference for real-time sensing and control of the vehicle 150. The HD map system 100 stores information and provides APIs that may allow a vehicle 150 to determine the lane that the vehicle 150 is currently in, the precise location of the vehicle 150 relative to the lane geometry, and other relevant features/data relative to the lane and adjoining and connected lanes.

Figure 7:
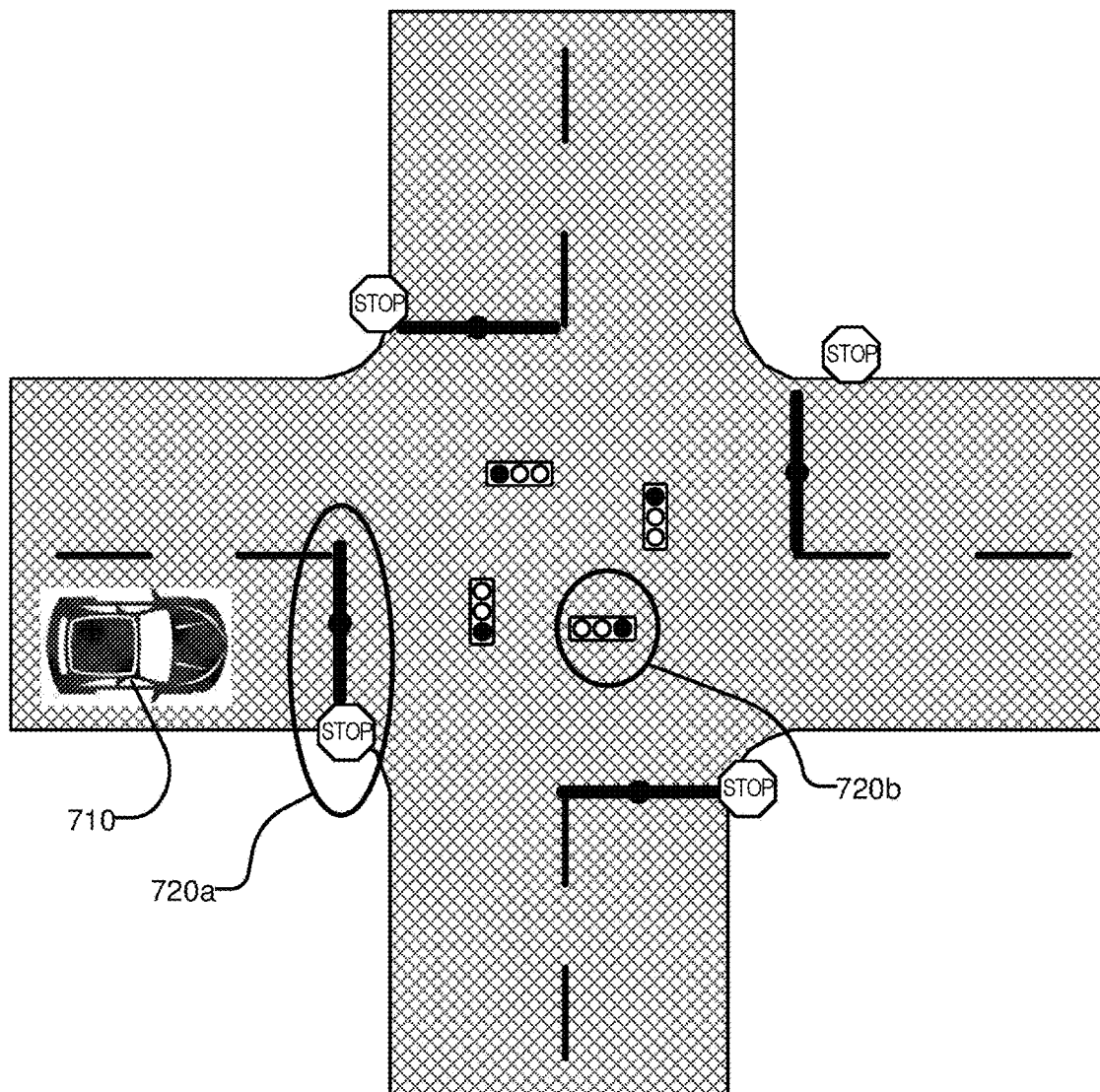
FIG. 7 illustrates example representations of lanes in an HD map.

FIG. 7 illustrates example lane representations in an HD map. FIG. 7 illustrates a vehicle 710 at a traffic intersection. The HD map system 100 provides the vehicle 710 with access to the map data that may be relevant for autonomous driving of the vehicle 710. This may include, for example, features 720*a* and 720*b* that may be associated with the lane but may not be the closest features to the vehicle 710. Therefore, the HD map system 100 may store a lane-centric representation of data that may represent the relationship of the lane to the feature so that the vehicle 710 can efficiently extract the features given a lane.

The HD map data may represent portions of the lanes as lane elements. The lane elements may specify the boundaries of the lane and various constraints including the legal direction in which a vehicle may travel within the lane element, the speed with which the vehicle may drive within the lane element, whether the lane element may be for left turn only, or right turn only, etc. In some embodiments, the HD map data may represent a lane element as a continuous geometric portion of a single vehicle lane. The HD map system 100 may store objects or data structures that may represents lane elements that may comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations, etc., as part of the HD map data.

Examples of lane elements represented by the HD map data may include, a piece of a right lane on a freeway, a piece of a lane on a road, a left turn lane, the turn from a left turn lane into another lane, a merge lane from an on-ramp an exit lane on an off-ramp, and a driveway. The HD map data may represent a one-lane road using two lane elements, one for each direction. The HD map system 100 may represents median turn lanes that may be shared similar to a one-lane road.

Figure 8A:
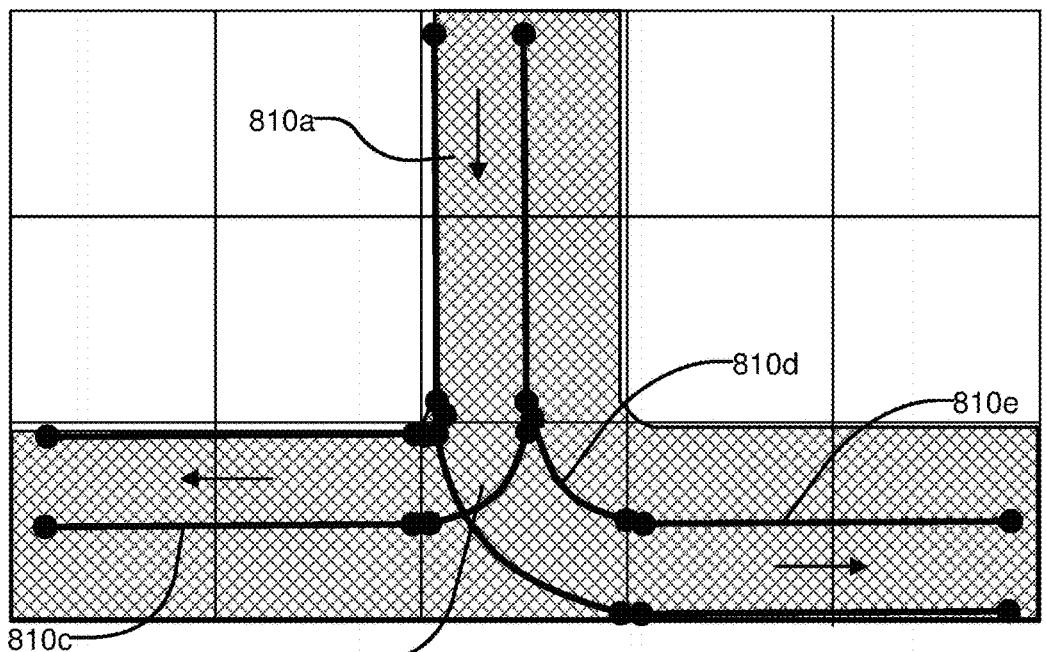
FIGS. 8A-8B illustrates example lane elements and relationships between lane elements in an HD map.
Figure 8B:
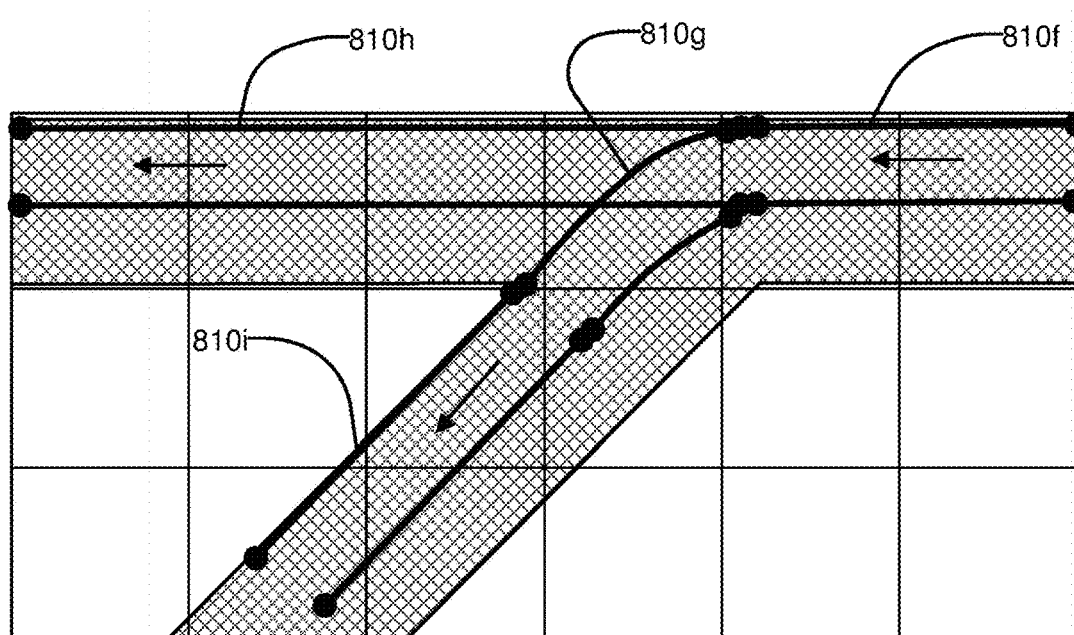

FIGS. 8A-B illustrate lane elements and relations between lane elements in an HD map. FIG. 8A illustrates an example of a T-junction in a road illustrating a lane element 810*a* that may be connected to lane element 810*c* via a turn lane 810*b* and is connected to lane 810*e* via a turn lane 810*d*. FIG. 8B illustrates an example of a Y-junction in a road illustrating label 810*f* connected to lane 810*h* directly and connected to lane 810*i* via lane 810*g*. The HD map system 100 may determine a route from a source location to a destination location as a sequence of connected lane elements that can be traversed to reach from the source location to the destination location.

Detecting Traffic Signs Using LIDAR Scans

Details regarding detecting traffic signs may be found in WO 2018/126228 A1, published Jul. 5, 2018, which is incorporated by reference in the present disclosure in its entirety for all that it discloses.

In some embodiments, a system may detect traffic signs using LIDAR scans. A LIDAR signal may be effective in measuring reflectiveness of surfaces. Traffic signs typically have higher reflectivity as compared to other surfaces such as surfaces on trees, buildings, etc. This higher reflectivity may be due to traffic signs being designed to be reflective so that drivers are able to see traffic signs in the light of headlights of a vehicle. In some embodiments, the system may detect a cluster of high intensity points in a point cloud obtained from a LIDAR. The system may determine whether the cluster of high intensity points is a traffic sign. Other objects that have a highly reflective surface may include license plates of vehicles. However, vehicles are typically moving in traffic and therefore these points do not typically form a cluster. Furthermore, if data is collected from multiple vehicles to generate an OMap, traffic signs may have a higher likelihood of being detected by multiple vehicles in the same place compared to a license plate of a vehicle and therefore may form a stronger cluster than a license plate of a vehicle.

In some embodiments, the system may detect clusters of points having a high intensity that are located close to each other. The system may fit a plane through the cluster of points and may also determines a bounding box around the cluster. The plane through the cluster and the bounding box around the cluster may provide an estimate of the location of the traffic sign.

In some embodiments, the system may project the points of the point cloud identified as a sign in the point cloud to an image to confirm whether there is a traffic sign represented by the points. The system may match the object in the image where the bounding box was detected. If the analysis of the image indicates a likelihood of having a traffic sign where the bounding box was identified in the point cloud, the system may determine a high likelihood of a traffic sign being present at that location.

In some embodiments, the system may also use deep learning techniques to determine a more accurate bounding box based on the image. The deep learning model may perform image classification to determine the type of traffic sign. The input to the neural network may be an encoding of a portion of the image that matches the bounding box and the output may represent coordinates of a more accurate bounding box for the traffic sign.

In some embodiments, the system may further use deep learning techniques to identify the type of traffic sign that was identified within the bounding box (e.g., a stop sign, a speed limit sign, yield sign, or any other traffic sign.) Accordingly, in some embodiments, the deep learning model may output five values including coordinates of four points representing the bounding box and the fifth value indicating a type of the traffic sign.

In some embodiments, the deep learning may be performed using a neural network trained using images of traffic signs that have previously been identified. The deep learning model may be a supervised deep learning model where training data is generated by projecting good images of known traffic signs whose type is known. The system may add error to the projected images to make the training data realistic. For example, the error may perform transformations to make the image fuzzy or less clear.

In some embodiments, the system may project the accurate bounding box back to the 3D coordinates of the point cloud. The system may store information in the point cloud identifying the accurate coordinates of the traffic sign. Accordingly, the information may be added to the HD map (thereby annotating the HD map with additional data identifying the traffic sign).

Figure 9:
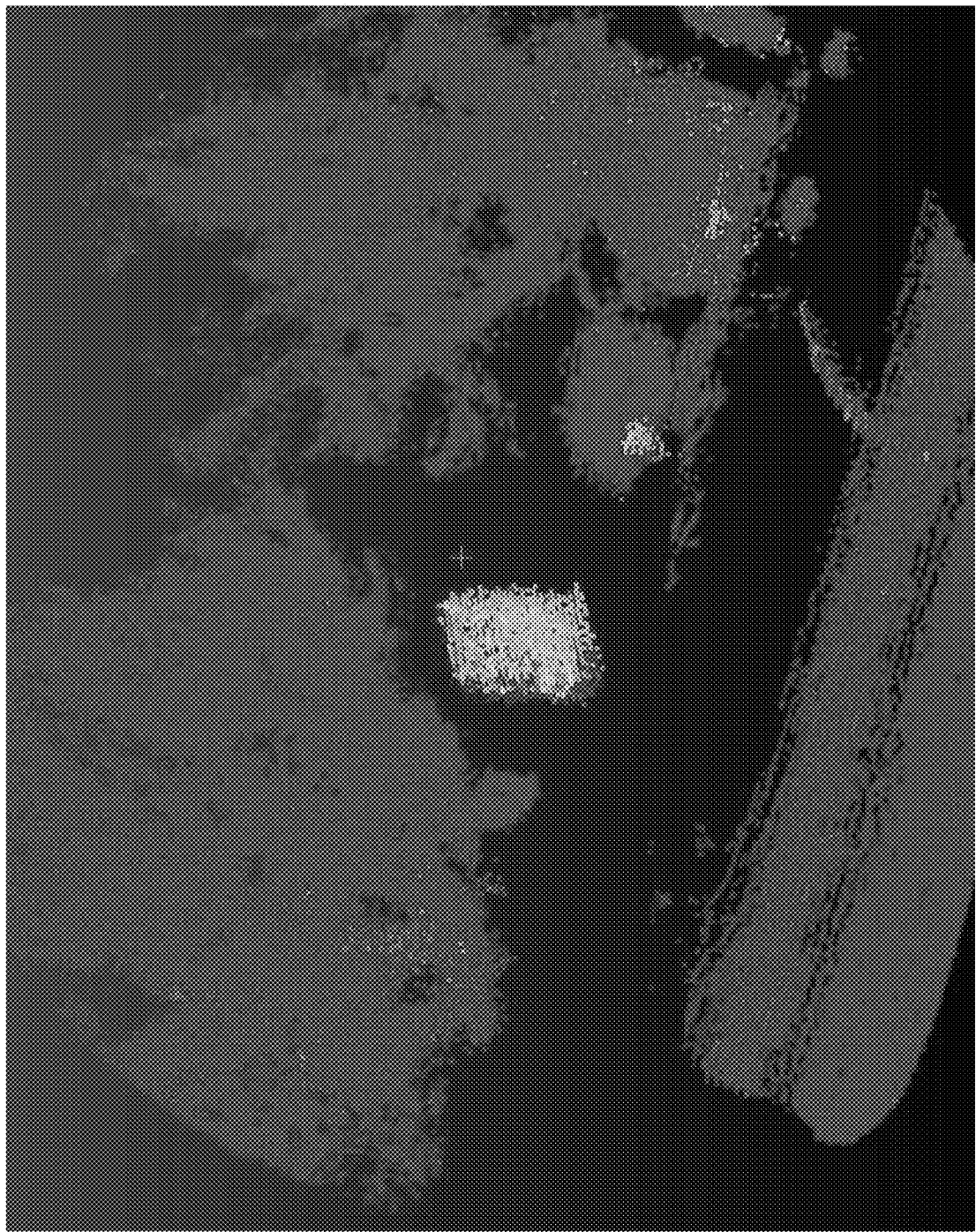
FIG. 9 illustrates an example LIDAR scan with high intensity LIDAR values returned by a highly reflective coating of a traffic sign.

FIG. 9 illustrates an example LIDAR scan with high intensity LIDAR values returned by a highly reflective coating of a traffic sign. In some embodiments, in order to increase the precision and recall of all traffic sign types, the system may use LIDAR intensity to independently detect traffic signs. Road signs may use a highly reflective coating which returns high intensity LIDAR values. The system may detect signs in the OMap points by thresholding the LIDAR intensity, clustering the resulting points and filtering the clusters to remove false positives. Detected LIDAR traffic signs may be classified using images and then may be aggregated with the image-based traffic sign detection pipeline to select the best representation of each traffic sign and to remove duplicated traffic sign detections. By using two traffic sign detection methods independently (e.g., image-based and LIDAR-based), the system may achieve a higher precision and recall and may require less manual detection of signs.

In some embodiments, using only image information to detect traffic signs may result in low recall on all traffic signs. For example, there may be traffic sign types that a deep learning model may not have been trained to detect and/or cases where a traffic sign in an image is difficult to detect because of occlusions in the scene or the background is too similar to the sign. Therefore, some embodiments which employ LIDAR-based traffic sign detection may result in a higher precision and higher sign recall percentage across all sign types.

Detecting LIDAR Signs

In some embodiments, the process of detecting signs in LIDAR involve a single LIDAR scan, merged LIDAR scans, OMap points, or any point cloud with intensity information. In some embodiments, a LIDAR sign detection pipeline may operate on OMap points but the sign detector algorithm may be the same across the different input types, with only the thresholds changing for the different data densities.

With regard to intensity filtering, in some embodiments, the primary criteria for detecting LIDAR signs may be the intensity value of the LIDAR points. The Velodyne LIDAR sensor may define intensity on a range of 0-255, with intensity values above 128 being reserved for retro-reflective surfaces. Road signs may be retro reflective targets and may generally produce LIDAR returns with intensity values greater than 128. These intensity values may be specific to the Velodyne LIDAR sensor, and for intensity information to be useful when there are multiple sensor types, the system may execute an intensity calibration step. Ideally, the entire sign surface may have high intensity points and all immediately adjacent non-sign surfaces may not have high intensity points. However, for some signs, only a subset of the points on the sign may be high intensity. The system may use LIDAR intensity to segment the LIDAR points.

In some embodiments, false positive detections may most commonly happen on vehicle license plates and surfaces which are very close to the LIDAR sensor because intensity may be a function of distance along with surface material and surface incidence angle.

With regard to clustering, in some embodiments, after using LIDAR intensity to segment the points, the system may perform a connect components clustering using Euclidean distance to group all of the points. In the case that multiple signs are next to each other, all of the points from the different signs may be assigned to the same cluster. Because the goal is to produce the location of all signs, the system may cluster multiple signs into a single object as separate signs can be manually created for each of the signs at that location. These groups may then be filtered according to a set of criteria to remove false positive detections.

With regard to plane fit, in some embodiments, the first criteria for filtering the cluster of points may be plane fitting. The system may threshold a minimum number of points in a cluster, but the system may need at least three points to fit a plane. Once the system fits a plane to the points (e.g., using a random sample consensus (RANSAC) algorithm), the system may filter non-planar sets of points by setting a threshold on the RANSAC plane fit inlier percentage (e.g., the more planar the object, the more points may be expected to be considered inliers after fitting the plane).

Figure 10:
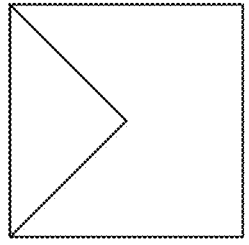
FIG. 10 illustrates surface area calculations for traffic signs.
Figure 10:
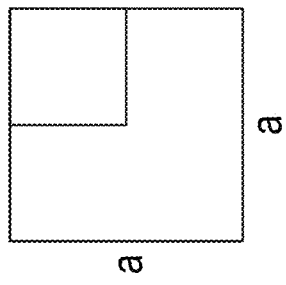

With regard to planar area, FIG. 10 illustrates surface area calculations for traffic signs. In some embodiments, the system may next filter the planar clusters by their approximate minimum surface area. The system may look at two axes along the plane, and for simplicity the system may not be specific about the in-plane axes. In practice, the system may take the normal of the sign and create the first arbitrary orthogonal vector by taking the cross product of the normal and a unit vector that is not parallel to the normal (i.e., a unit vector of <1,0,0> as long as the normal is not zero for both y & z). The system may then produce the second plane axis by the cross product of the normal and the arbitrary orthogonal vector. The system may then select the minimum and maximum values of the points projected along these axes to find the "length" and "width" of the object in the plane and multiply them together to produce the area of the cluster. Although choosing two axes which do not correspond to the sign's true length and width may result in incorrect planar area calculations, the maximum difference in area between two choices of axes for a square is 2, as disclosed in FIG. 10.

With regard to normal direction, in some embodiments, the system may determine the normal direction of the plane fitting on the point cluster. If the normal is determined to be roughly orthogonal with the ground, the system may keep the normal. This step may be used to remove false positives in plants and bushes which show up at the side of the road when the vehicle drives close to them.

With regard to height above ground, in some embodiments, the system may use an optional criteria to filter the cluster by its distance above the ground. Accordingly, a cluster of high intensity points may be determined to have a higher likelihood of being a traffic sign (e.g., as opposed to a license plate or other non-traffic sign) if it has a height that is at least a threshold above the ground (e.g., a height above the typical height of a license plate). The system may use a ground fitting algorithm to determine the height of the cluster. In some embodiments, there may be signs which are near the height of the road surface, such as an in-street pedestrian crosswalk sign.

With regard to a result, in some embodiments, the system implementing a sign detector may return a collection of structures storing sign information, with each structure including the collection of LIDAR points that compose the sign and the normal of the sign cluster. Later in the LIDAR sign generation pipeline, the system may take the normal and project all of the sign points in the cluster onto the sign plane to find the bounding box of all of the sign points in 2D. From the 2D corners and plane information the system may derive the 3D vertices of the sign feature.

With regard to a LIDAR sign detection pipeline, in some embodiments, to detect signs in LIDAR points at scale, the system may run the LIDAR sign detection in a production pipeline which may be executed within a larger pipeline. The LIDAR sign pipeline may include three steps: detection, deduplication with image signs, and classification of sign type by projecting the LIDAR detected feature onto an image and using an image-based deep learning classifier to identify the feature type. The detection process may consume a local sector worth of OMap points and may return all of the sign features within the local sector. The unit of processing may be a different unit than a local sector. However, using smaller chunks may increase the probability of splitting a sign across a chunk boundary, and using larger processing units may increase the error due to the approximation of the region as a flat plane as the system may convert all of the points into a single coordinate system. In some embodiments, the intensity filtering and clustering may be done at a more global level to avoid local sector boundaries and the process may be moved to a MapReduce or similar framework. In some embodiments, this level of performance optimization may not be necessary because the LIDAR sign pipeline and the image sign pipeline may wait for the longest running process to finish before deduplicating the signs, so the cost of the LIDAR sign pipeline may be hidden by the cost to run the image sign pipeline.

With regard to integration with image-based detections, in some embodiments, after detecting LIDAR signs in OMap points, the system may have produced the same sign as some of the image-based sign detections. To prevent the import of duplicate features into the map to be reviewed, the system may select the unique signs between the signs generated from LIDAR detection and the image detections. The system may perform this by joining all the image sign pipelines and the LIDAR sign pipeline after the features have been generated and deduplicating both sets for sign features against each other and against the features previously determined and stored.

Figure 11:
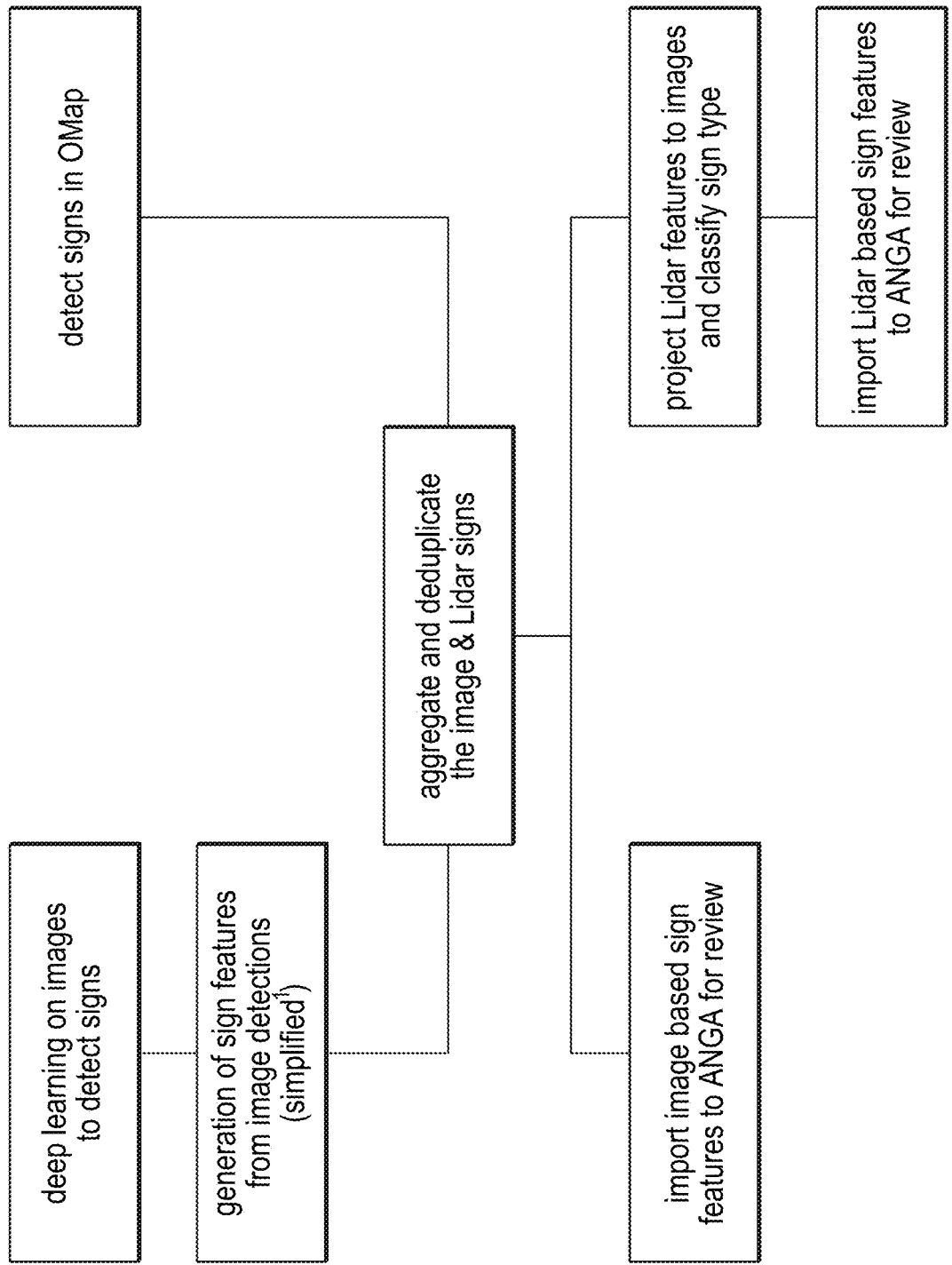
FIG. 11 illustrates a flow chart of an example sign auto-generation pipeline.
Figure 12:
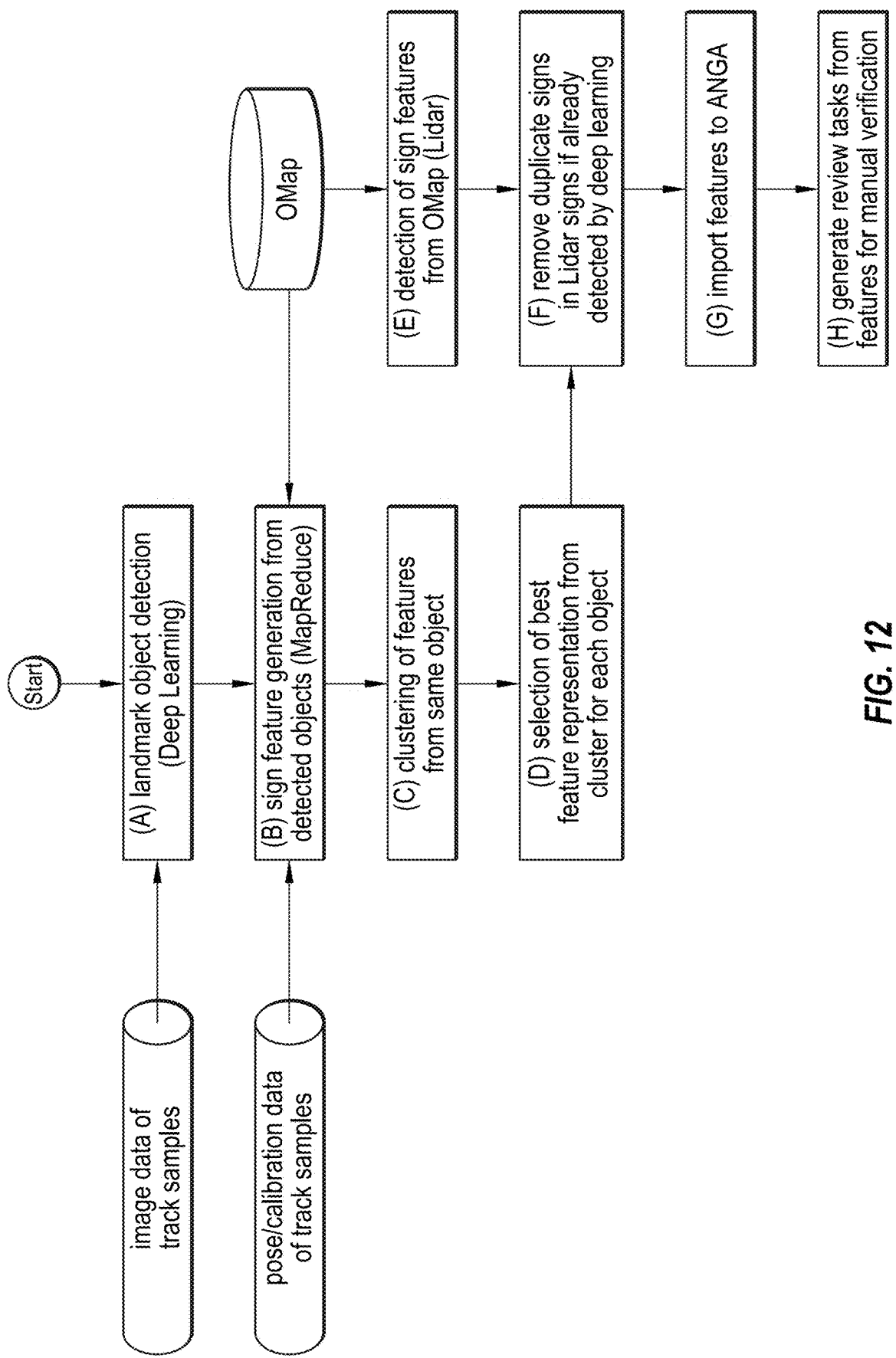
FIG. 12 illustrates a flow chart of a high-level workflow of sign auto-generation.

FIG. 11 illustrates a flow chart of an example sign auto-generation pipeline. FIG. 12 illustrates a flow chart of a high-level workflow of sign auto-generation. As disclosed in FIGS. 11 and 12, in some embodiments, LIDAR sign generation may fit into an entire auto-generation of signs pipeline. In some embodiments, when an alignment is being processed for automatic generation of landmark objects, image data of the tracks belonging to the alignment may be processed by the sign detection pipeline to detect semantic objects using deep learning on the image plane. In some embodiments, deep learning inference may fetch track sample images and may generate sign proposal objects in each image. In some embodiments, after detection of objects in the image plane, 3D landmark objects may be reconstructed using deep learning detection input. This process may also involve camera calibration, tracking sample pose, and transforming data to perform reconstruction. In some embodiments, a sign feature generator may fetch object detection results from storage and, au generates sign features in world coordinates using OMap data. In some embodiments, a sign feature aggregator may cluster generated protos into groups based on distance and orientation angles and may store them in storage. In some embodiments, a sign feature selector may select a best feature from each cluster using a custom feature selection technique that scores each feature based a range of metrics and selects a feature with a highest score. These selected features may be grouped by a local sector key. In some embodiments, a LIDAR sign detector may detect traffic signs from OMap saves. Traffic sign detection using this technique may be based on the fact that traffic signs have high reflectivity thereby resulting in OMap points with high intensity on the map. In some embodiments, a sign deduplicator may remove duplicate signs from these LIDAR sign detection results that have already been detected by a deep learning-based technique. In some embodiments, a feature importer may upload auto-generated features to the cloud. This step may also assign a feature ID to these newly generated features. In some embodiments, a review task generator may use feature IDs and a total number of features generated from a feature-index-file to group features and upload for a sign review tool that may be employed by a user.

LIDAR-Based Detection of Traffic Signs

Figure 13:
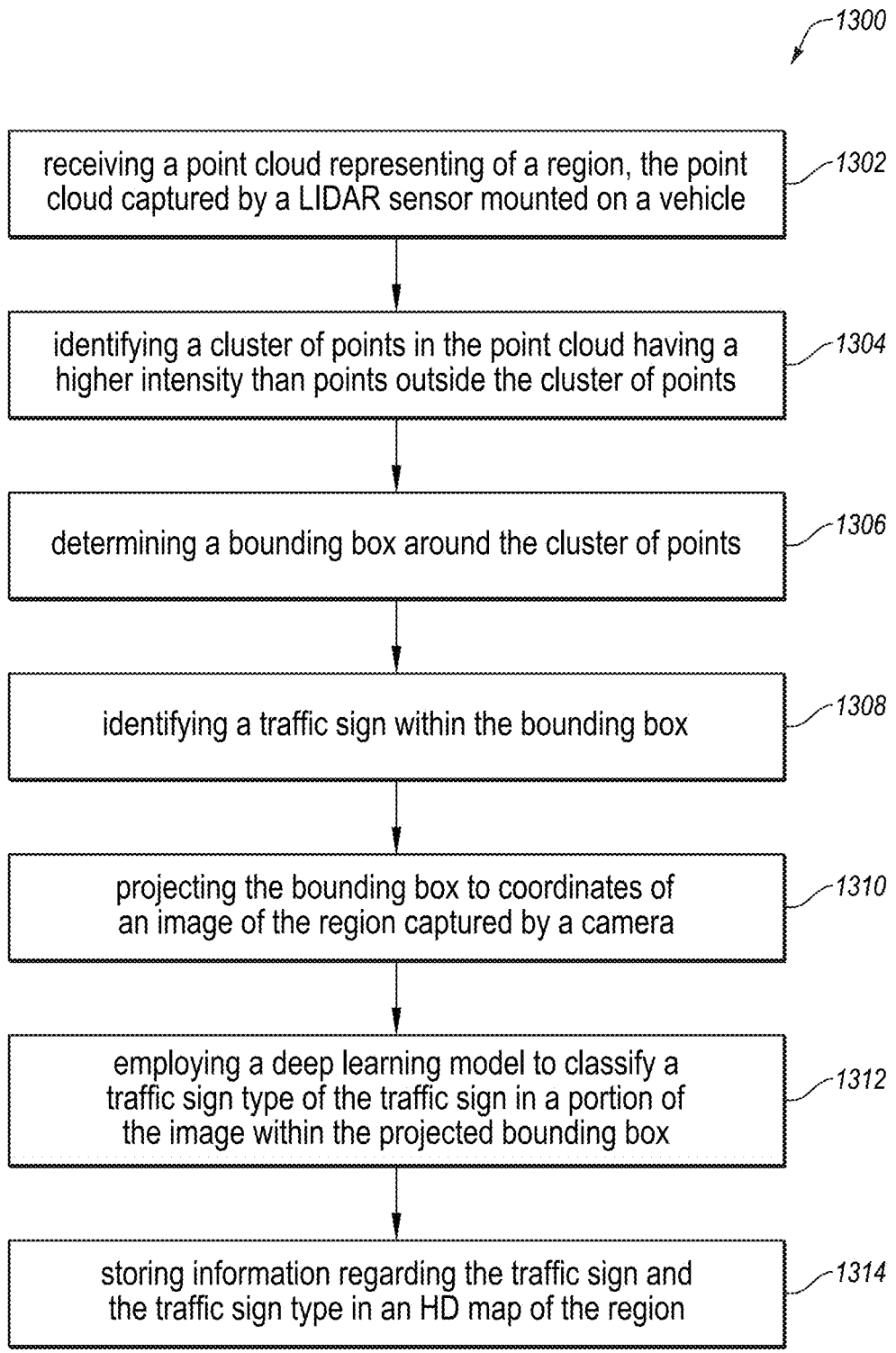
FIG. 13 illustrates a flowchart of an example method for LIDAR-based detection of traffic signs.

FIG. 13 illustrates a flowchart of an example method 1300 for LIDAR-based detection of traffic signs. The method 1300 may be performed by any suitable system, apparatus, or device. For example, one or more elements of the HD map system 100 of FIG. 1 may be configured to perform one or more of the operations of the method 1300. Additionally or alternatively, the computer system 1400 of FIG. 14 may be configured to perform one or more of the operations associated with the method 1300. Although illustrated with discrete blocks, the actions and operations associated with one or more of the blocks of the method 1300 may be divided into additional blocks, combined into fewer blocks, or eliminated, depending on the particular implementation.

The method 1300 may include, at action 1302, receiving a point cloud representing a region, the point cloud captured by a LIDAR sensor mounted on a vehicle. For example, the map update module 420 may receive, at action 1302, a point cloud representing a region, with the point cloud having been captured by a LIDAR sensor mounted on a vehicle.

The method 1300 may include, at action 1304, identifying a cluster of points in the point cloud having a higher intensity than points outside the cluster of points. For example, the map update module 420 may identify, at action 1304, a cluster of points in the point cloud having a higher intensity than points outside the cluster of points.

The method 1300 may include, at action 1306, determining a bounding box around the cluster of points. In some embodiments, the determining of the bounding box around the cluster of points may include fitting a plane through the cluster of points, and identifying coordinates of corners of the bounding box on the plane. In these embodiments, the fitting of the plane through the cluster of points may include using a random sample consensus (RANSAC) algorithm to determine the plane which has a highest probability of fitting the cluster of points. For example, the map update module 420 may determine, at action 1306, a bounding box around the cluster of points The method 1300 may include, at action 1308, identifying a traffic sign within the bounding box. For example, the map update module 420 may identify, at action 1308, a traffic sign within the bounding box.

The method 1300 may include, at action 1310, projecting the bounding box to coordinates of an image of the region captured by a camera. In some embodiments, the method 1300 may further include determining whether an area of the cluster of points is greater than a threshold area (e.g., an area of a smallest expected traffic sign) to determine whether the cluster of points represents a traffic sign. In these embodiments, the projecting of the bounding box to the coordinates of the image may be performed in response to determining that the area of the cluster of points is greater than the threshold area. In some embodiments, the method 1300 may further include determining whether a plane fitting through the cluster of points is at a vertical angle compared to a ground plane to determine whether the cluster of points represents a traffic sign. In these embodiments, the projecting of the bounding box to the coordinates of the image may be performed in response to determining that the plane fitting through the cluster of points is with a threshold value of being at a vertical angle compared to the ground plane. Further, in some embodiments, the method 1300 may further include determining a height of the cluster of points above a ground plane to determine whether the cluster of points represents a traffic sign. In these embodiments, the projecting of the bounding box to the coordinates of the image may be performed in response to determining that the cluster of points is at a height of at least a threshold value (e.g., a height higher than a typical license plate) above the ground plane. In some embodiments, the method 1300 may further include determining whether the cluster of points has an expected sign shape (e.g., any shape of all known traffic signs) to determine whether the cluster of points represents a traffic sign. In these embodiments, the projecting of the bounding box to the coordinates of the image may be performed in response to determining that the cluster of points has an expected shape. For example, the map update module 420 may project, at action 1310, the bounding box to coordinates of an image of the region captured by a camera.

The method 1300 may include, at action 1312, employing a deep learning model to classify a traffic sign type of the traffic sign in a portion of the image within the projected bounding box. In some embodiments, the deep learning model may be further employed to output more accurate coordinates for the bounding box in order to store the more accurate coordinates in the HD map of the region. For example, the map update module 420 may employ, at action 1312, a deep learning model to classify a traffic sign type of the traffic sign in a portion of the image within the projected bounding box.

The method 1300 may include, at action 1314, storing information regarding the traffic sign and the traffic sign type in an HD map of the region. For example, the map update module 420 may store, at action 1314, information regarding the traffic sign and the traffic sign type in an HD map of the region.

Subsequent to the action 1314, the method 1300 may employ the HD map with the updated traffic sign information to update the HD map store 165, and/or in navigating the vehicle 150 based on the updated traffic sign information. Further, the method 1300 may be employed repeatedly as the vehicle 150 navigates along a road. For example, the method 1300 may be employed when the vehicle 150 (or another non-autonomous vehicle) starts driving, and then may be employed repeatedly during the navigation of the vehicle 150 (or another non-autonomous vehicle). The vehicle 150 may navigate by sending control signals to controls of the vehicle 150. The method 1300 may also be employed by the vehicle computing system 120 of the vehicle 150 and/or by the online HD map system 110 to update traffic sign information in the HD map. In some embodiments, the method 1300 may be employed by the vehicle computing system 120 and/or by the online HD map system 110 to identify traffic sign based on a higher intensity of a cluster of points in the point cloud captured by the LIDAR sensor may have a higher precision and/or a higher recall than a purely image-based sign detection method.

Computer System Architecture

Figure 14:
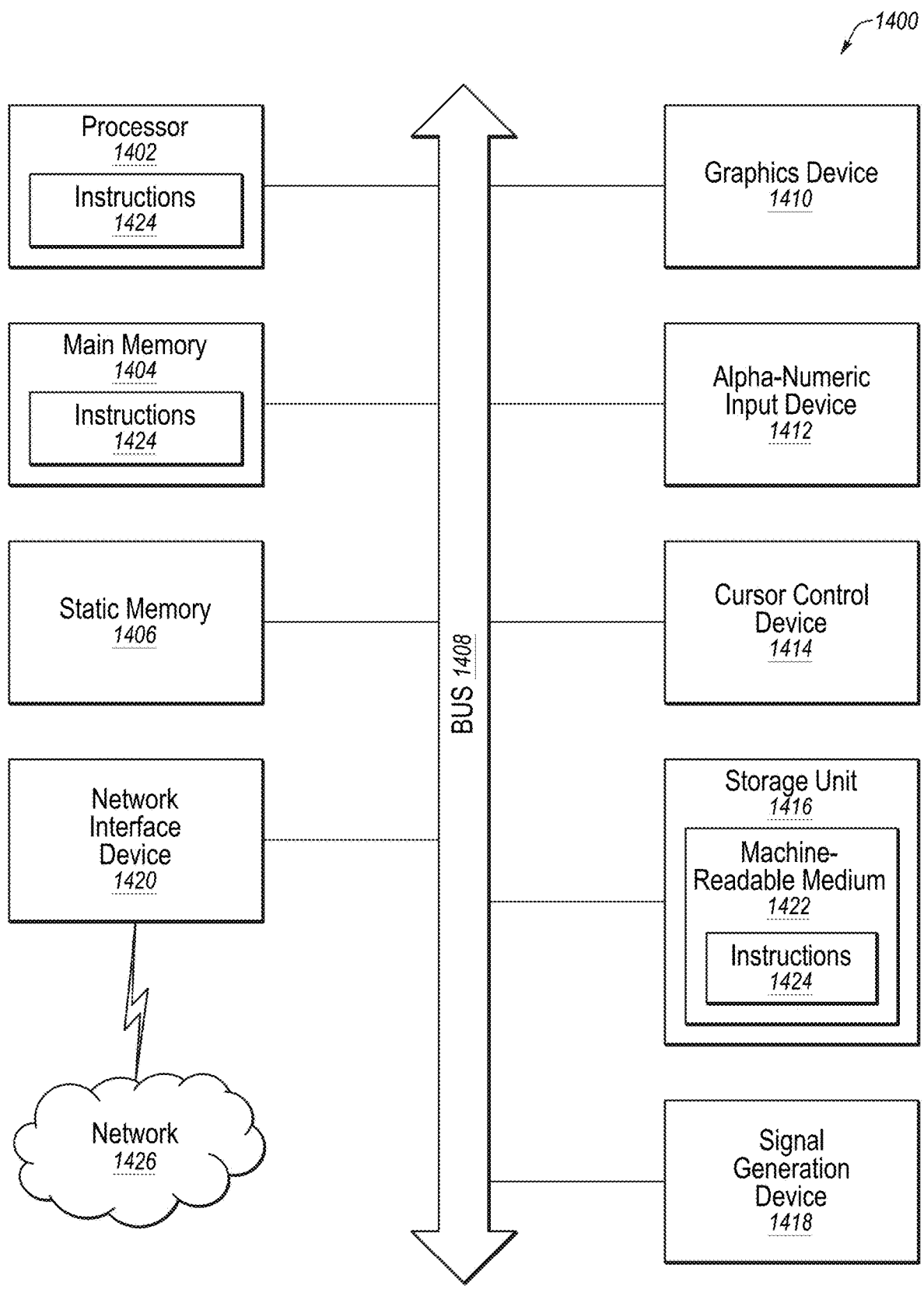
FIG. 14 illustrates an example embodiment of a computing machine that can read instructions from a machine-readable medium and execute the instructions in a processor or controller.

FIG. 14 is a block diagram illustrating components of an example computer system able to read instructions from a machine-readable medium and execute them in a processor (or controller). Specifically, FIG. 14 shows a diagrammatic representation of a machine in the example form of a computer system 1400 within which instructions 1424 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1424 (sequential or otherwise) that specify actions to be taken by that machine. Further, while only a single machine is illustrated, the term "machine" shall also be taken to include any collection of machines that individually or jointly execute instructions 1424 to perform any one or more of the methodologies discussed herein.

The example computer system 1400 may be part of or may be any applicable system described in the present disclosure. For example, the online HD map system 110 and/or the vehicle computing systems 120 described above may comprise the computer system 1400 or one or more portions of the computer system 1400. Further, different implementations of the computer system 1400 may include more or fewer components than those described herein. For example, a particular computer system 1400 may not include one or more of the elements described herein and/or may include one or more elements that are not explicitly discussed.

The example computer system 1400 includes a processor 1402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1404, and a static memory 1406, which are configured to communicate with each other via a bus 1408. The computer system 1400 may further include graphics display unit 1410 (e.g., a plasma display panel (PDP), a liquid crystal display (LCD), a projector, or a cathode ray tube (CRT)). The computer system 1400 may also include alphanumeric input device 1412 (e.g., a keyboard), a cursor control device 1414 (e.g., a mouse, a trackball, a joystick, a motion sensor, or other pointing instrument), a storage unit 1416, a signal generation device 1418 (e.g., a speaker), and a network interface device 1420, which also are configured to communicate via the bus 1408.

The storage unit 1416 includes a machine-readable medium 1422 on which is stored instructions 1424 (e.g., software) embodying any one or more of the methodologies or functions described herein. The instructions 1424 (e.g., software) may also reside, completely or at least partially, within the main memory 1404 or within the processor 1402 (e.g., within a processor's cache memory) during execution thereof by the computer system 1400, the main memory 1404 and the processor 1402 also constituting machine-readable media. The instructions 1424 (e.g., software) may be transmitted or received over a network 1426 via the network interface device 1420.

While machine-readable medium 1422 is shown in an example embodiment to be a single medium, the term "machine-readable medium" should be taken to include a single medium or multiple media (e.g., a centralized or distributed database, or associated caches and servers) able to store instructions (e.g., instructions 1424). The term "machine-readable medium" shall also be taken to include any medium that is capable of storing instructions (e.g., instructions 1424) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to,"

the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc.", or "at least one of A, B, or C, etc." or "one or more of A, B, or C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
   identifying a cluster of points in a point cloud corresponding to a region, the cluster of points being identified based at least on a comparison between respective intensity values of points of the cluster of points as compared to respective intensity values of one or more points outside of the cluster of points;
   determining a bounding shape corresponding to the cluster of points;
   determining that the bounding shape corresponds to a traffic sign;
   determining a location of the bounding shape in an image;
   encoding a portion of the image corresponding to the location as an input for a deep learning model;
   obtaining an output of the deep learning model that is based at least on the input, the output including:
      one or more adjustments to coordinates corresponding to the bounding shape; and
      an indication of a traffic sign type of the traffic sign depicted in the portion of the image; and
   storing information corresponding to the traffic sign and the traffic sign type in association with the cluster of points corresponding to the bounding shape.

2. The method of claim 1, wherein coordinates corresponding to the bounding shape are stored in association with a map corresponding to the region and including the point cloud.

3. The method of claim 1, wherein:
   the determining the corresponding location of the bounding shape is performed further in response to determining that a plane fitting through the cluster of points is within a threshold value of being at a vertical angle compared to a ground plane.

4. The method of claim 1, wherein:
   the determining the corresponding location of the bounding shape is performed further in response to determining that the cluster of points is at a height of at least a threshold value above a ground plane.

5. A processor comprising:
   processing circuitry to cause performance of operations comprising:
      identifying a cluster of points in a point cloud corresponding to a region, the cluster of points being identified based at least on points of the cluster of points having respective intensity values satisfying a threshold;
      determining a bounding shape corresponding to the cluster of points;
      projecting the bounding shape to an image;
      encoding a portion of the image corresponding to the bounding shape as an input for a deep learning model;
      obtaining an output of the deep learning model that is based at least on the input, the output including:
         one or more adjustments to the bounding shape; and
         an indication of a traffic sign type corresponding to a traffic sign depicted in the portion of the image; and
      storing information regarding the traffic sign and the traffic sign type in association with map data corresponding to points that correspond to the bounding shape as adjusted.

6. The processor of claim 5, wherein the deep learning model or another deep learning model is further used to output data indicative of coordinates for the bounding shape.

7. The processor of claim 5, wherein:
   the projecting of the bounding shape to the image is performed further in response to determining that a plane fitting through the cluster of points is within a threshold value of being at a vertical angle compared to a ground plane.

8. The processor of claim 5, wherein:
   the projecting of the bounding shape to the image is performed further in response to determining that the cluster of points is at a height of at least a threshold value above a ground plane.

9. The processor of claim 5, wherein:
   the projecting of the bounding shape to of the image is performed further in response to determining that the cluster of points has an expected shape.

10. A system comprising:
one or more processing units to perform operations comprising:
- identifying a cluster of points in a point cloud corresponding to a region, the cluster of points being identified based at least on respective intensity values corresponding to the points of the cluster of points;
- determining a bounding shape corresponding to the cluster of points;
- identifying a traffic sign within the bounding shape;
- projecting the bounding shape to an image depicting at least a portion of the region;
- encoding a portion of the image corresponding to the bounding shape as an input for a deep learning model;
- obtaining an output of the deep learning model that is based at least on the input, the output including:
  - one or more adjustments to the bounding shape; and
  - an indication of a traffic sign type of the traffic sign depicted in the portion of the image; and
- storing information regarding the traffic sign and the traffic sign type in a map corresponding to the region.

11. The system of claim 10, wherein the deep learning model or another deep learning model is further used to output coordinates for the bounding shape in order to store the coordinates in the map corresponding to the region.

12. The system of claim 10, wherein:
the projecting of the bounding shape to the image is performed further in response to determining that the cluster of points satisfies a threshold size.

13. The system of claim 10, wherein:
the projecting of the bounding shape to the image is performed further in response to determining that a plane fitting through the cluster of points is with a threshold value of being at a vertical angle compared to a ground plane.

14. The system of claim 10, wherein:
the projecting of the bounding shape to the image is performed further in response to determining that the cluster of points is at a height of at least a threshold value above a ground plane.

* * * * *